US012783021B2

(12) United States Patent
Mounioloux

(10) Patent No.: US 12,783,021 B2
(45) Date of Patent: Nov. 3, 2026

(54) COMPUTER MOTHERBOARD

(71) Applicant: Rouchon Industries, Inc., Anaheim, CA (US)

(72) Inventor: Stephen Mounioloux, Anaheim, CA (US)

(73) Assignee: Rouchon Industries, Inc., Anaheim, CA (US)

( * ) Notice: Subject to any disclaimer, the term of this patent is extended or adjusted under 35 U.S.C. 154(b) by 0 days.

(21) Appl. No.: 19/429,698

(22) Filed: Dec. 22, 2025

(65) Prior Publication Data

US 2026/0126836 A1 May 7, 2026

Related U.S. Application Data

(63) Continuation-in-part of application No. 18/590,652, filed on Feb. 28, 2024.

(51) Int. Cl.
*G06F 1/16* (2006.01)
*G06F 1/185* (2026.01)

(52) U.S. Cl.
CPC .................................... *G06F 1/185* (2013.01)

(58) Field of Classification Search
CPC ........ H05K 1/142; G06F 1/185; H01R 12/722
See application file for complete search history.

(56) References Cited

U.S. PATENT DOCUMENTS 5,555,158 A 9/1996 Dent
6,231,144 B1 5/2001 Chen et al.
8,687,350 B2 4/2014 Santos
2005/0068723 A1 3/2005 Squillante
2005/0259389 A1 11/2005 Lin
2006/0003606 A1* 1/2006 Wei-Chieh ........... H01R 12/722 439/65
2011/0043989 A1 2/2011 Tien et al.
2011/0053387 A1* 3/2011 Liu ......................... G06F 1/185 439/55

(Continued)

FOREIGN PATENT DOCUMENTS

FR 2878988 A3 6/2006
KR 10-2019-0023336 A 3/2019

OTHER PUBLICATIONS

International Search Report and Written Opinion issued in related Application Serial No. PCT/US2025/017873 on May 12, 2025.

(Continued)

*Primary Examiner* — Anthony Q Edwards
(74) *Attorney, Agent, or Firm* — Holland & Knight LLP; Matthew C. Cox; Forrest S. Tinnin

(57) ABSTRACT

The present disclosure provides for a computing system. The computing device may include a motherboard. The motherboard may include a first edge, a second edge, a third edge opposite the first edge, and a fourth edge opposite the second edge. The first edge may be longer than the second edge. The computing device may further include socket for a central processing unit disposed on the motherboard. The computing device may further include an expansion connector. The expansion connector may include one or more expansion slots oriented parallel relative to the motherboard, and be configured to receive an add-on card such that the add-on card is parallel relative to the motherboard.

20 Claims, 37 Drawing Sheets

(56) References Cited

U.S. PATENT DOCUMENTS

| | | | | |
|---|---|---|---|---|
| 2011/0279988 | A1* | 11/2011 | Conway | H05K 1/142 29/830 |
| 2017/0086332 | A1 | 3/2017 | Jaskela et al. | |
| 2017/0115704 | A1 | 4/2017 | Ent et al. | |
| 2020/0342125 | A1 | 10/2020 | Doyle et al. | |
| 2023/0071666 | A1 | 3/2023 | Hartouniyan et al. | |
| 2024/0032241 | A1 | 1/2024 | Coxe, III et al. | |

OTHER PUBLICATIONS

International Search Report and Written Opinion issued in Application PCT/US2025/025215 on Jul. 21, 2025.

* cited by examiner

COMPUTER MOTHERBOARD

CROSS-REFERENCES TO RELATED APPLICATIONS

This application is a continuation-in-part of U.S. Application Ser. No. 18/590,652, filed Feb. 28, 2024, entitled COMPUTER MOTHERBOARD, which is hereby incorporated by reference in its entirety.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to computing devices. More particularly, the present disclosure relates to motherboards with add-on cards, such as graphics processing units ("GPUs").

A personal computer is a stand-alone desktop computing device housed in a chassis. Such computing devices typically include a motherboard and central processing unit ("CPU") positioned thereon, along with other circuitry and electrical components. In many computing devices, an add-on card such as a GPU is connected to the CPU. Conventional computing devices are in alignment with a standard that orients the GPU perpendicular to the motherboard. However, such orientation has been found to present a number of issues. For instance, due to the fact that motherboards are typically oriented parallel to the elongate shape of the chassis, the perpendicular orientation of the GPU relative to the motherboard blocks airflow running through the chassis. Moreover, other components, such as memory modules, are also oriented perpendicular to the motherboard, and thus cut off such airflow that would otherwise reach the GPU itself. As the processing power of computing devices has increased, more heat is generated within computing devices and, thus, more airflow is required in order to cool the GPU (and other components) in order to allow for optimal function of the computing device.

Additionally, the standard by which many conventional computing devices follow requires a power connector to be oriented perpendicular to the motherboard. Such orientation requires the use of various ribbon cables that must navigate one or more contours in order to reach the correct panel of the chassis, and thus connect to an external power source. Such contours often lead to degradation and otherwise suboptimal function.

It would be advantageous to provide a computing device that addresses the increasing severity of these issues, in addition to other problems. What is needed, then, are improvements in apparatuses and methods for computing devices.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a computing device. The computing device may include a motherboard. The motherboard may include a first edge, a second edge, a third edge opposite the first edge, and a fourth edge opposite the second edge. The first edge may be longer than the second edge. The computing device may further include a socket disposed on the motherboard and configured to receive a central processing unit. The computing device may further include an expansion connector. The expansion connector may include one or more expansion slots oriented parallel relative to the motherboard. In some embodiments, the expansion connector is a Peripheral Component Interconnect Express connector.

In some embodiments, the computing device further includes an add-on card disposed on the expansion connector, such that the add-on card is oriented parallel relative to the motherboard. In further embodiments, the add-on card is coplanar relative to the motherboard. In some cases, the add-on card is a graphics processing unit.

In some embodiments, the computing device further includes a power connector disposed on the motherboard along the second edge of the motherboard. The power connector may include one or more power connector slots oriented parallel relative to the motherboard.

In some embodiments, the computing device further includes one or more input / output connectors disposed on the motherboard located along the fourth edge of the motherboard. In further embodiments, the computing device further includes a memory module disposed on the motherboard.

In further embodiments, the computing device includes a chassis. The chassis may include a back panel, a sleeve, and a mounting panel. The back panel may be removably secured to the sleeve, and the mounting panel may be disposed on the back panel, such that the mounting panel extends into the sleeve. In such embodiments, the motherboard may be disposed on the mounting panel and oriented parallel to the mounting panel. In some embodiments, the add-on card and the motherboard are oriented vertically. For instance, the add-on card may be located above the motherboard. In this sense, the one or more input / output connectors may be facing the back panel. In some embodiments, the back panel includes an input / output shield aligned with the add-on card.

Another aspect of the present disclosure is a method of providing the aforementioned computing device. The method may include providing the motherboard, installing the central processing unit on the motherboard, and installing the add-on card on the motherboard, such that the add-on card is oriented parallel to the motherboard.

In some embodiments, the method may further include installing an expansion connector on the motherboard, securing the motherboard to the back panel, and securing the back panel to the sleeve, such that the motherboard is inserted within the sleeve, and the chassis is formed by the sleeve and the back panel.

Numerous other objects, advantages and features of the present disclosure will be readily apparent to those of skill in the art upon a review of the following drawings and description of a preferred embodiment.

DETAILED DESCRIPTION

Figure 1:
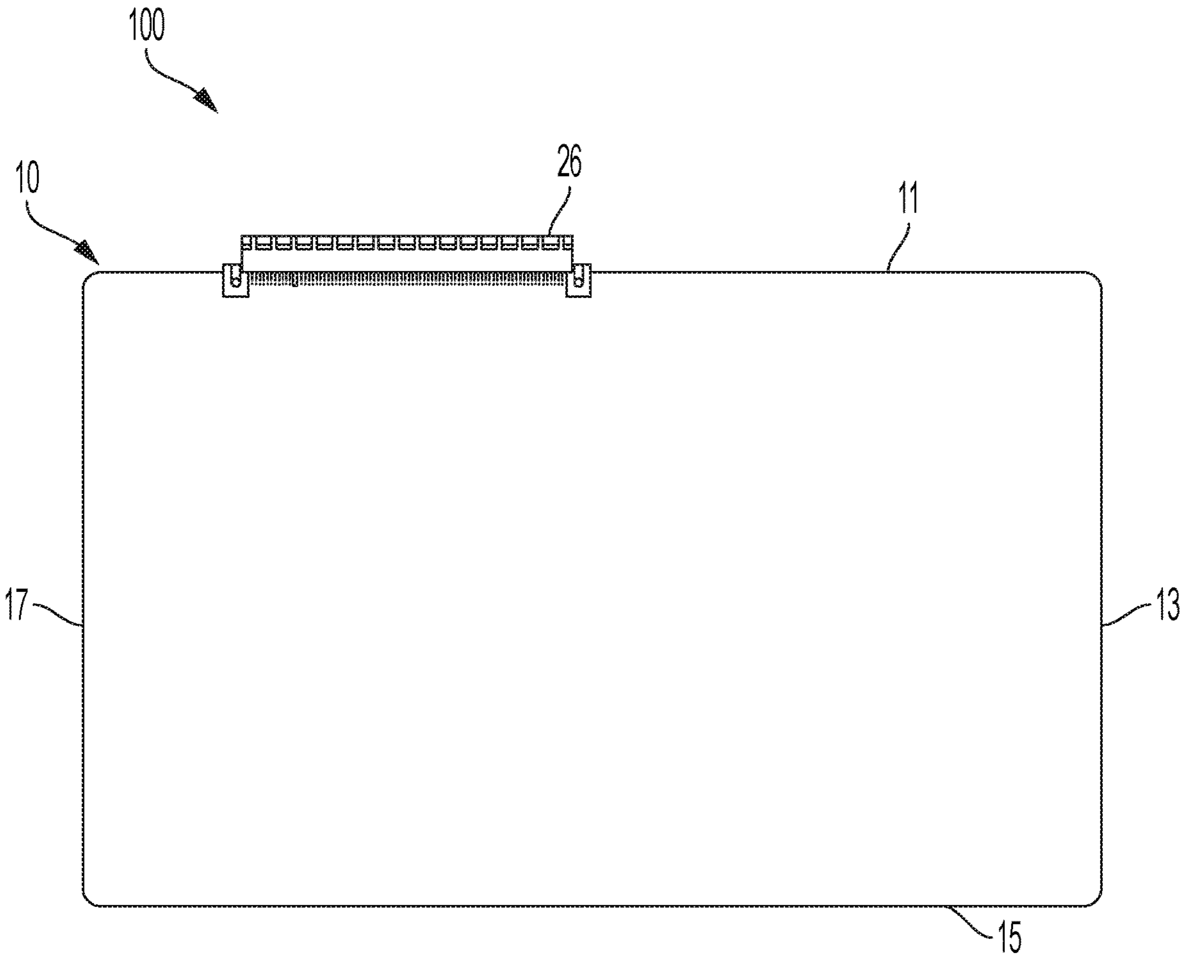
FIG. 1 is a schematic side view of a motherboard for a computing device, according to some embodiments of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Figure 2:
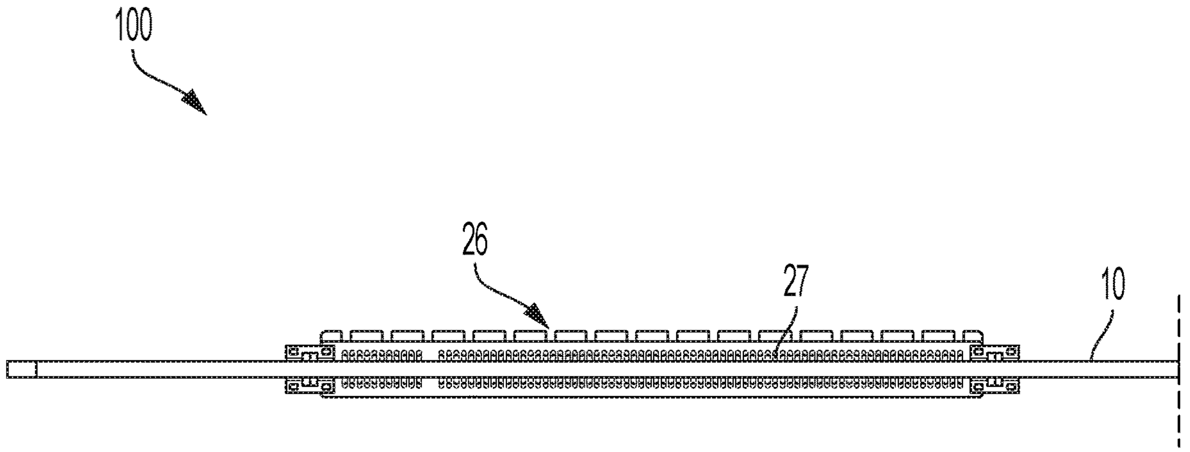
FIG. 2 is a top view of the motherboard of FIG. 1, according to some embodiments of the present disclosure.

Referring now to FIGS. 1-2, a computing device ("device") 100 is shown, according to some embodiments of the present disclosure. The device 100 may include a motherboard 10 (e.g., a printed circuit board). The motherboard 10 may include a first edge 11 and a second edge 13. As between the first and second edges 11, 13, the first edge 11 may be of a long, straight dimension, and the second edge 13 may be of a short, straight dimension. In other words, the first edge 11 may be longer than the second edge 13. The motherboard 10 may include a third edge 15 opposite the first edge 11, and a fourth edge 17 opposite the second edge 13. The third edge 15 may be of equal (or substantially equal) length relative to the first edge 11; and the fourth edge 17 may be of equal (or substantially equal) length relative to the second edge 13.

As discussed in greater detail below with reference to FIGS. 5-9, the device 100 may include a socket 33 disposed on the motherboard 10. The socket 33 may be configured to receive a central processing unit ("CPU") 24. It should be appreciated that other such sockets and components 21 received thereon may be disposed on the motherboard 10, amounting to suitable control circuitry and other electronics. Additionally, as discussed in greater detail below with reference to FIGS. 3-4, The device 100 may include an add-on card 14. Generally, the add-on card 14 (e.g., an expansion board, an expansion card, etc.) may be a hardware component that can be connected to the components of the motherboard 10 in order to enhance the functionality of the device 100. For example, the add-on card 14 may be a graphics processing unit. Of course, the add-on card 14 may be any suitable hardware for being received by an expansion connector 26, as discussed in greater detail below.

Figure 3:
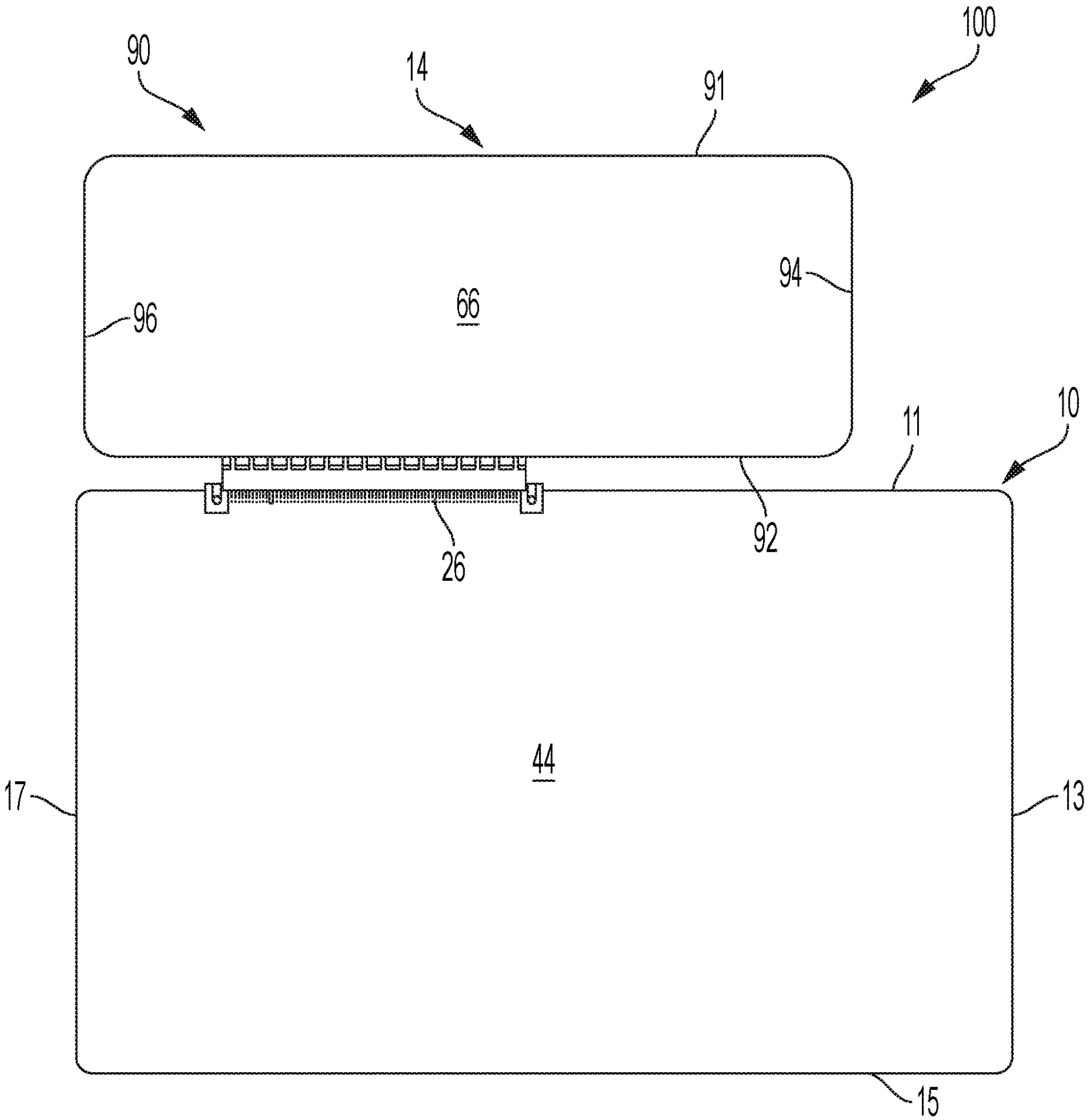
FIG. 3 is a side view of the motherboard of FIG. 1 with an add-on card connected thereto, according to some embodiments of the present disclosure.
Figure 9:
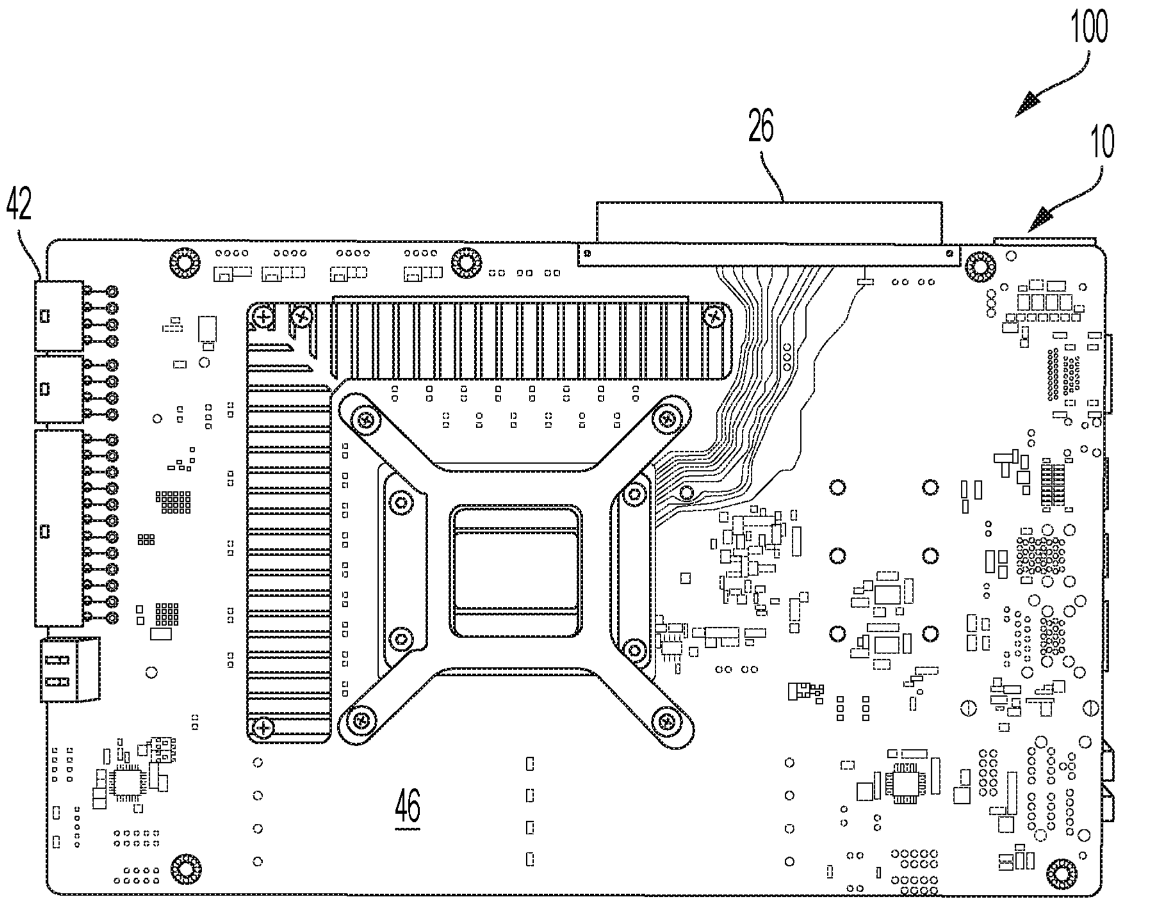
FIG. 9 is a side view of the motherboard of FIG. 6, according to other embodiments of the present disclosure.

As shown with reference to FIGS. 3 and 9, the motherboard 10 may form a substantially planar body that includes a first face 44 (e.g., a top face on which a substantial amount of such components 21 are disposed), and a second face 46 (e.g., a bottom face) opposite and parallel to the first face 44. As shown with reference to FIG. 4, the add-on card 14 may form a substantially planar body that includes a first face 66 and a second face 68 (e.g., on which a substantial amounts of add-on card components 29 may be disposed) opposite and parallel to the first face 66.

As mentioned above, the device 100 may include the expansion connector 26, which may include one or more expansion connector slots 27 configured to interface with a component of the computing device 100. Depending on the implementation, the expansion connector 26 may be disposed on the motherboard 10. In some embodiments, the expansion connector 26 is disposed on the motherboard 10 along the first edge 11. For instance, the expansion connector 26 may be positioned on the first edge 11 such that the expansion connector slots 27 face outwards and away from the motherboard 10 (from a top-view perspective as suggested with reference to FIG. 1). In other embodiments, and as discussed in greater detail below with reference to FIGS. 23-31, the expansion connector slots 27 may face parallel to the motherboard 10. The expansion connector slot(s) 27 may be configured in a generally elongate fashion. Thus, when the expansion connector 26 is disposed on the motherboard 10 as shown with particular reference to FIG. 2, the expansion connector slot(s) 27 may be oriented parallel relative to the motherboard 10 (e.g., parallel relative to the plane generally defined by the planar body of the motherboard 10, or a motherboard axis 62 defined by the motherboard 10).

The add-on card 14 may be disposed on the expansion connector 26. Thus, the expansion connector 26 may provide an input/output pathway or route that allows the add-on card 14 to connect to the CPU 24 (and other appropriate motherboard components 21 on the motherboard 10) via printed circuit wiring on the motherboard 10. Due to the aforementioned orientation of the expansion connector 26, the add-on card 14 (which may include one or more add-on card components 29), when disposed on the expansion connector 26 as shown, may be oriented parallel relative to the motherboard 10.

In some embodiments, the expansion connector 26 is a peripheral component interconnect ("PCI"). In other embodiments, the expansion connector 26 is a PCI extended ("PCI-X"), which is designed to enhance the legacy PCI for higher bandwidth. In other embodiments still, the expansion connector 26 is a PCI Express ("PCI-e"), which is a high-speed serial computer expansion bus standard designed to replace the legacy PCI and PCI-X. In general, the expansion connector 26 may be a motherboard interface for computer graphics cards, sound cards, hard disk drive host adapters, SSDs, Wi-Fi, and Ethernet hardware connections, and may be configured in any suitable fashion for receiving the add-on card 14 and orienting the add-on card 14 in a parallel configuration relative to the motherboard 10.

Figure 4:
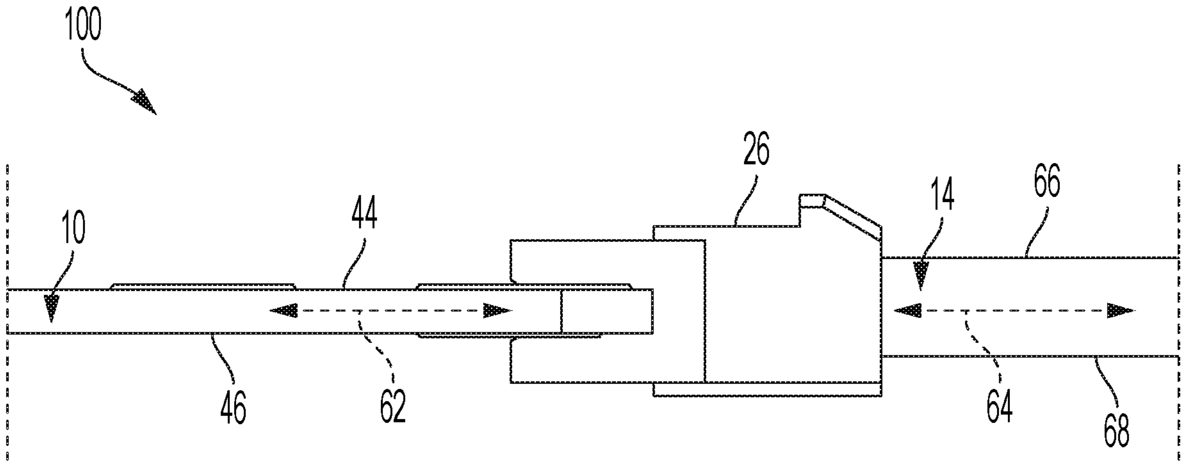
FIG. 4 is a front view of the motherboard and add-on card of FIG. 3, according to some embodiments of the present disclosure.
Figure 5:
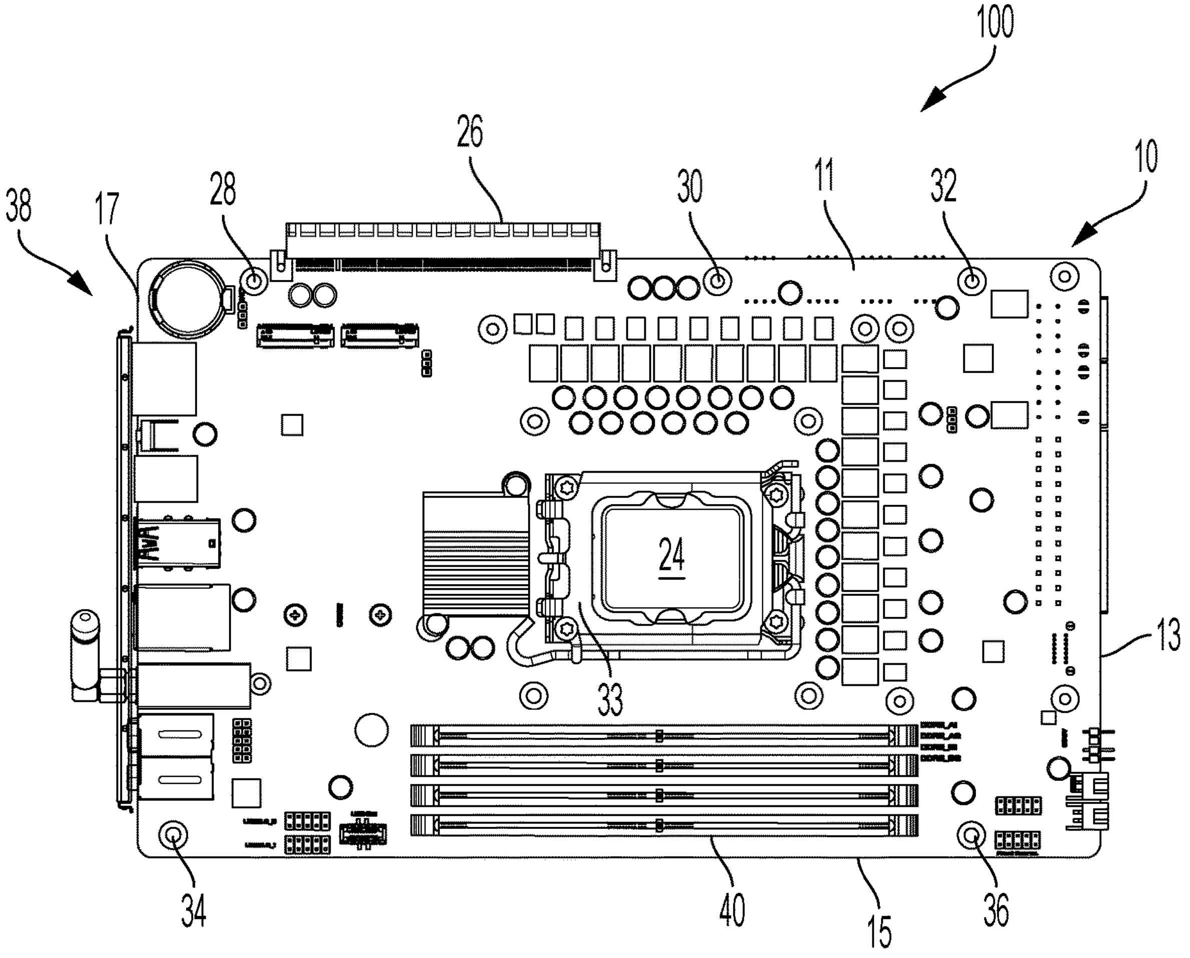
FIG. 5 is a side view of a motherboard of a computing device, according to some embodiments of the present disclosure.
Figure 6:
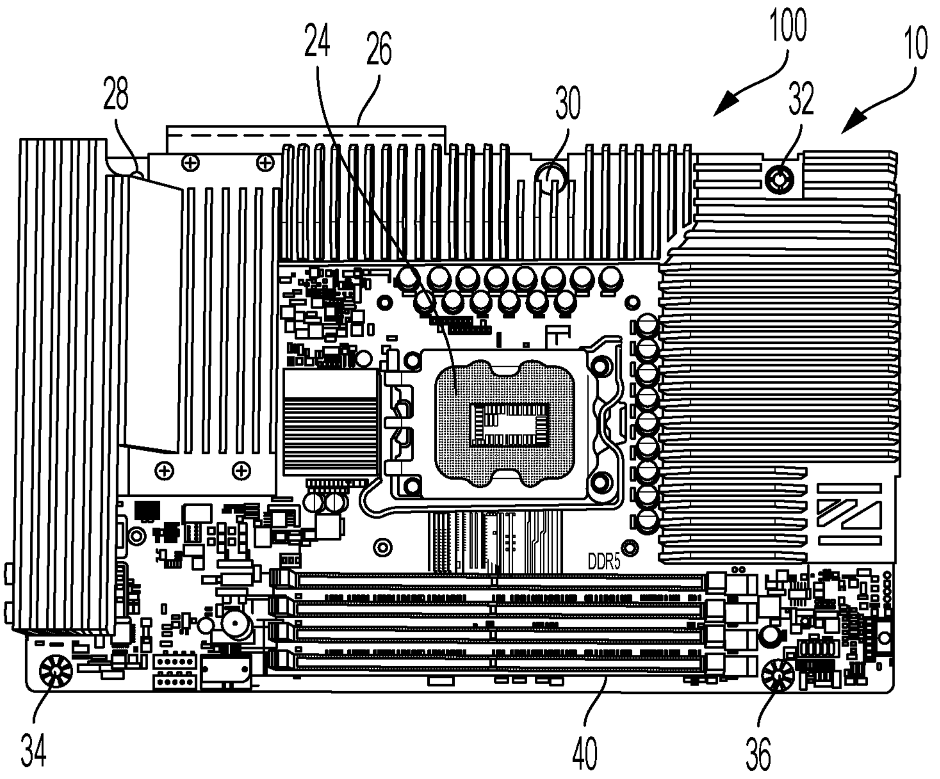
FIG. 6 is a side view of an exemplary implementation of a motherboard of a computing device, according to some embodiments of the present disclosure.
Figure 7:
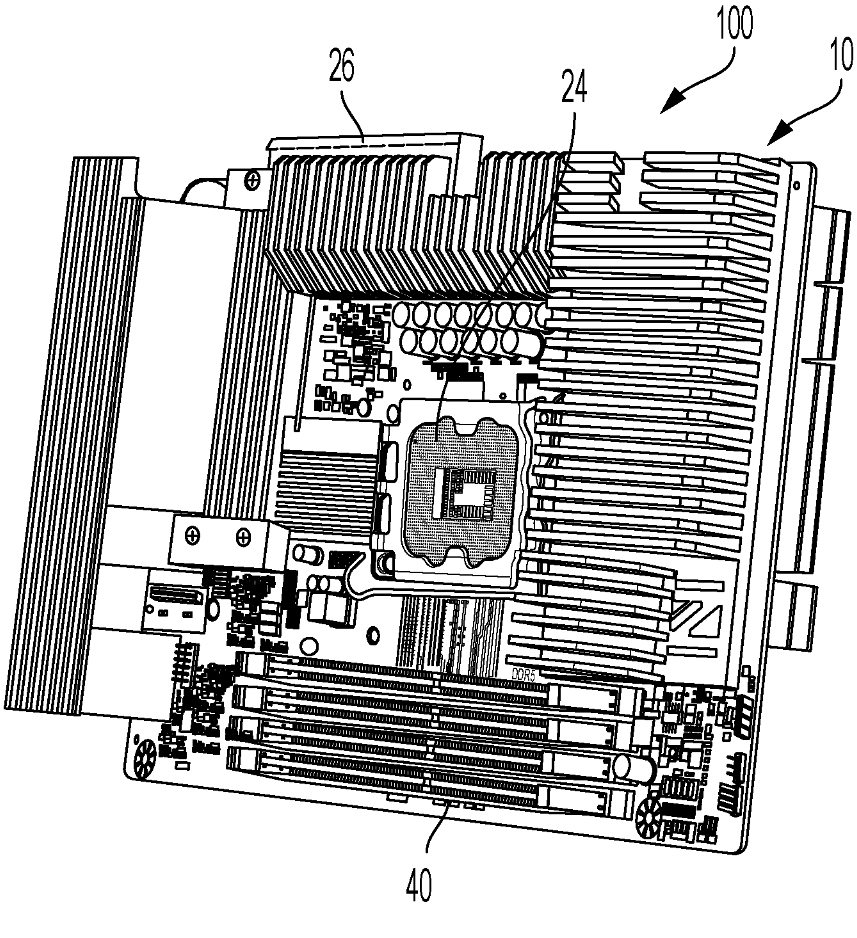
FIG. 7 is an upper perspective view of the motherboard of FIG. 6, according to some embodiments of the present disclosure.
Figure 8:
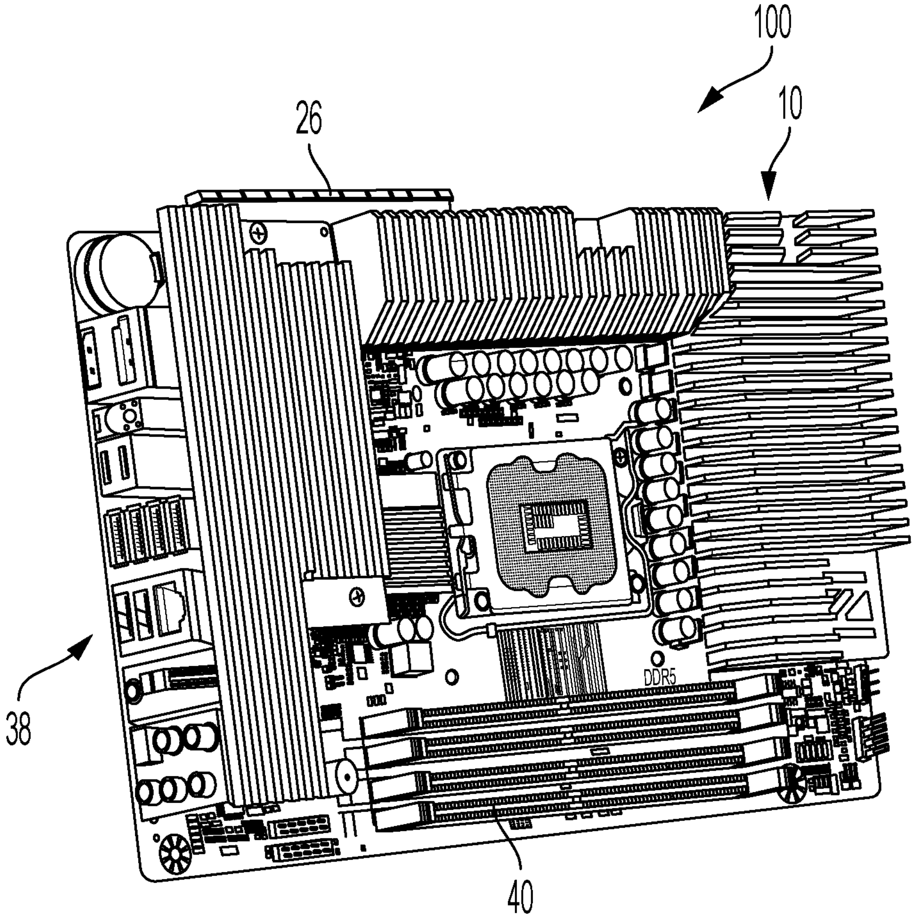
FIG. 8 is a lower perspective view of the motherboard of FIG. 6, according to some embodiments of the present disclosure.

Referring now to FIGS. 3-4, the device 100 is shown with the add-on card 14 disposed on the expansion connector 26, according to some embodiments of the present disclosure. As mentioned above, the expansion connector 26 may be disposed on (and is oriented, along a longitudinal axis defined thereby, parallel to) the first edge 11. In this sense, the expansion connector slots 27 may be oriented perpendicularly (or substantially perpendicular) relative to the first edge 11. Thus, the add-on card 14 (or, more generally, the planar feature broadly defined by the shape of the add-on card 14) may be oriented in parallel relative to the motherboard 10 (or, more generally, the planar feature broadly defined by the shape of the motherboard 10). As a first example, the first and/or second faces 44, 46 of the motherboard 10 may be parallel to the first and/or second faces 66, 68 of the add-on card 14. As a second example, the motherboard axis 62 (e.g., an axis that runs parallel to the first and/or second faces 44, 46 of the motherboard 10) may be parallel to an add-on card axis 64 (e.g., an axis that runs parallel to the first and/or second faces 66, 68 of the add-on card 14). In further embodiments, the add-on card 14 is coplanar with the motherboard 10. For example, one of the first or second faces 66, 68 of the add-on card 14 define a plane that lies on the same plane defined by one of the first or second faces 44, 46 of the motherboard 10. In further embodiments still, the motherboard axis 62 is parallel to and lies on the same plane as the add-on card axis 64.

Referring now to FIGS. 5-9, the motherboard 10 is shown in greater detail, according to some embodiments of the present disclosure. As mentioned above, the device 100 may include the motherboard 10 and the CPU 24 disposed on the motherboard 10, along with control circuitry and other electronics (e.g., the components 21). As a first example, device 100 may include a memory module connector 40 disposed on the motherboard 10. For instance, the memory module 40 may be a random access memory ("RAM") slot 40. In this sense, and as depicted with reference to FIG. 11, the device 100 may include a memory card 41 disposed on the memory module 40. As a second example, the device 100 (or, in other words, the components 21) may include input/output ("IO") connectors 38, which may facilitate the connections of IO devices such as a video monitor, mouse, or printer to the control circuity and other electronics of the device 100. In general, and as depicted with particular reference to FIG. 5 and with additional reference to FIG. 10, the motherboard 10 and one or more of the aforementioned components disposed thereon or connected thereto, including the add-on card 14, may form a motherboard assembly 90. In other words, the motherboard assembly 90 may include the motherboard 10 and the add-on card 14.

Figure 10:
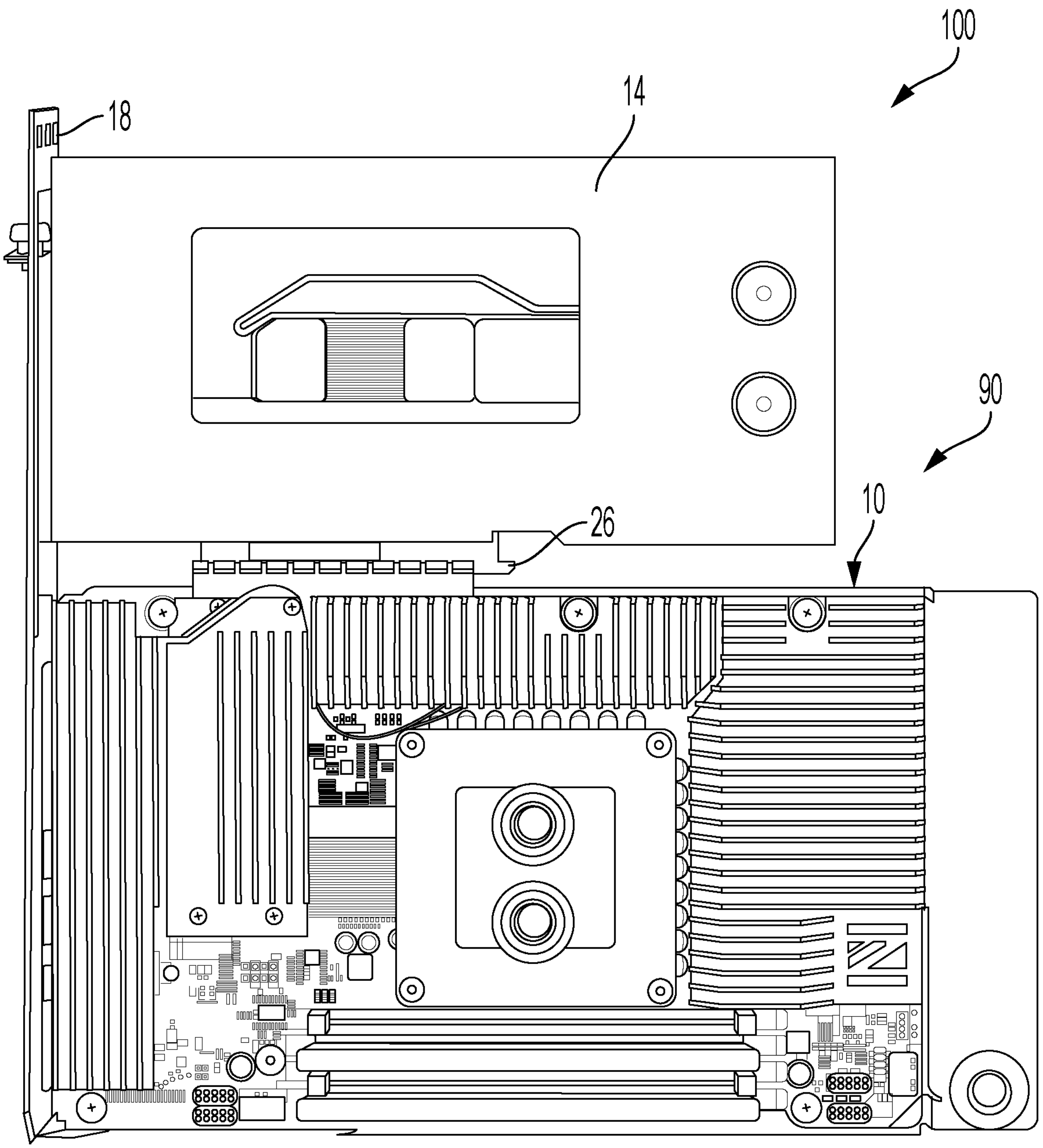
FIG. 10 is a side view of an exemplary implementation of a motherboard of a computing device with an add-on card connected thereto, according to some embodiments of the present disclosure.

Referring now to FIG. 10, the device 100 is shown with the motherboard assembly 90 secured to a chassis 12 (or a portion of thereof, as discussed in greater detail below), according to some embodiments of the present disclosure. As shown, the add-on card 14 and the motherboard 10 may be oriented vertically. Thus, the add-on card 14 may be located above the motherboard 10. Of course, in further embodiments, the orientation may be adjusted such that the add-on card 14 is located below the motherboard 10, or on one of the lateral sides of the motherboard 10. Moreover, it should be appreciated that the overall device 100 may be oriented in any number of suitable fashions, such that the add-on card 14 is located to the left or right of the motherboard 10. Indeed, it should be noted that the descriptions and depictions discussed herein are exemplary in nature, and should be considered non-limiting embodiments of the present disclosure.

As discussed in greater detail below with reference to FIGS. 11-13, the device 100 may include the chassis 12 configured to house and secure the motherboard assembly 90. The chassis 12 may include a back panel 18. The motherboard 10 and/or the add-on card 14 may be mounted on or otherwise secured to the back panel 18. As shown, the motherboard 10 and/or the add-on card 14 may be oriented perpendicular to the back panel 18.

In some embodiments, the back panel 18 includes an interface 20 configured to secure the one or more IO connectors 38 disposed on the motherboard 10. Additionally, the back panel 18 may include an IO shield 23. The IO shield 23 may be aligned with the add-on card 14. The IO shield 23 may be configured to secure additional IO connectors disposed on the add-on card 14. In some embodiments, particularly in cases where the add-on card 14 is a GPU, the IO shield 23 may include a vent, which may advantageously be arranged to allow air to be drawn through the chassis and past the add-on card 14. While the position of the IO shield 23 may be moved to any suitable location(s) on the chassis 12, it should be appreciated that the parallel position of the add-on card 14 relative to the motherboard 10 may advantageously allow a free stream of air to pass through the chassis 12, thus enhancing the cooling effects resulting from air travel throughout the chassis. Moreover, the chassis 12 may be reduced in terms of footprint size due to the vertically structured arrangement of the motherboard assembly 90.

Figure 11:
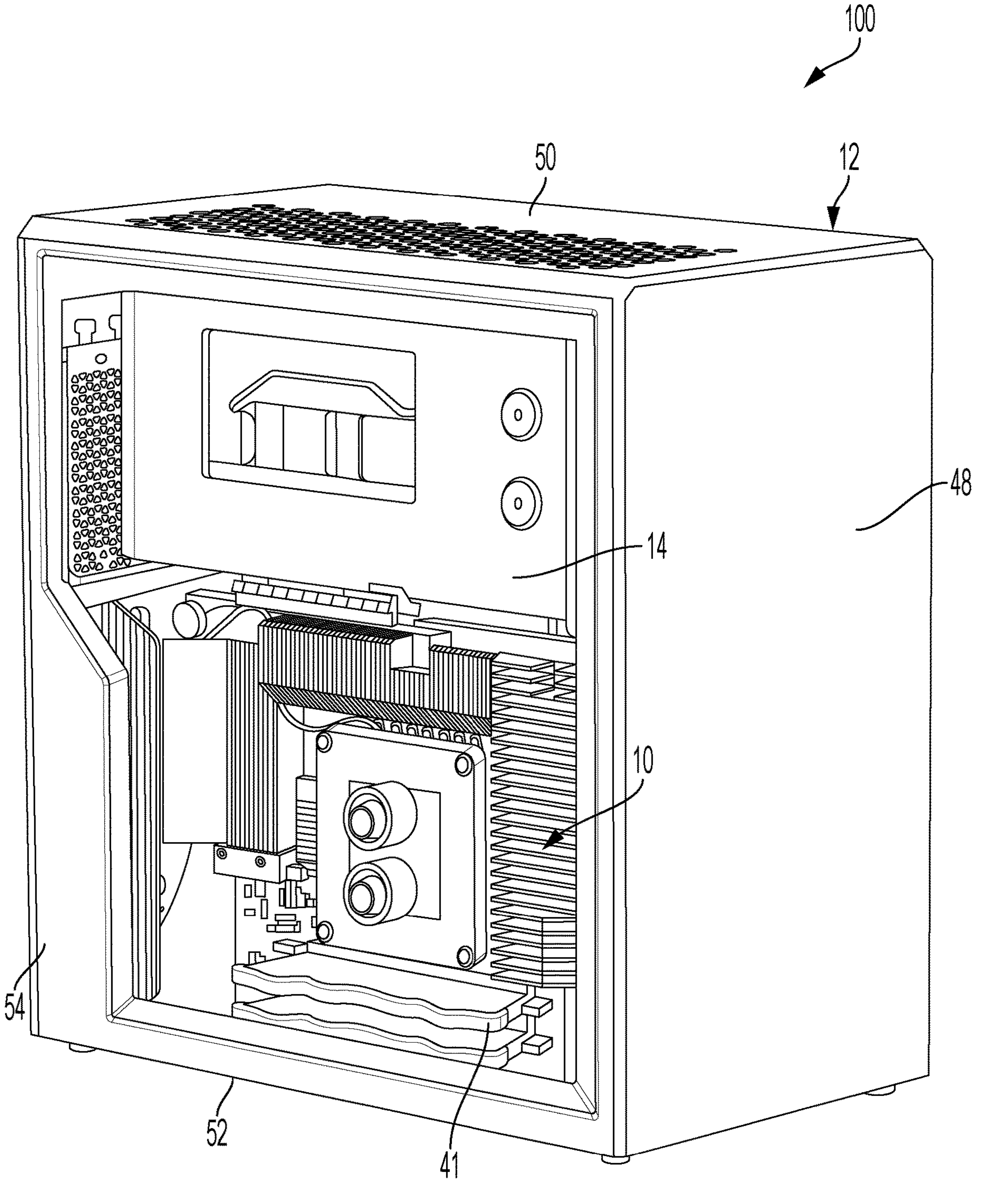
FIG. 11 is a perspective view of the motherboard of FIG. 10 positioned within a chassis, according to some embodiments of the present disclosure.
Figure 12:
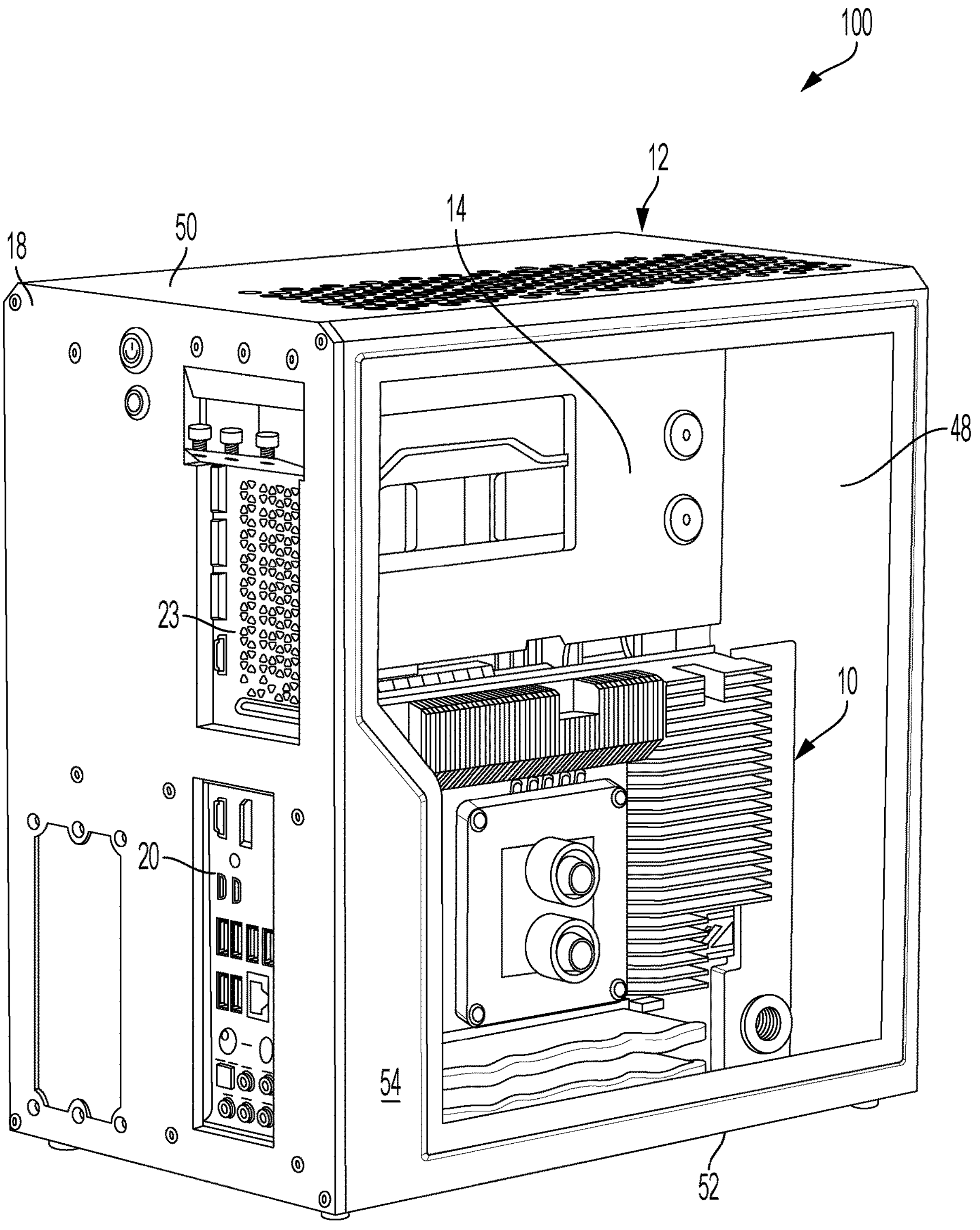
FIG. 12 is a perspective view of the motherboard of FIG. 10 positioned within a chassis, according to other embodiments of the present disclosure.
Figure 13:
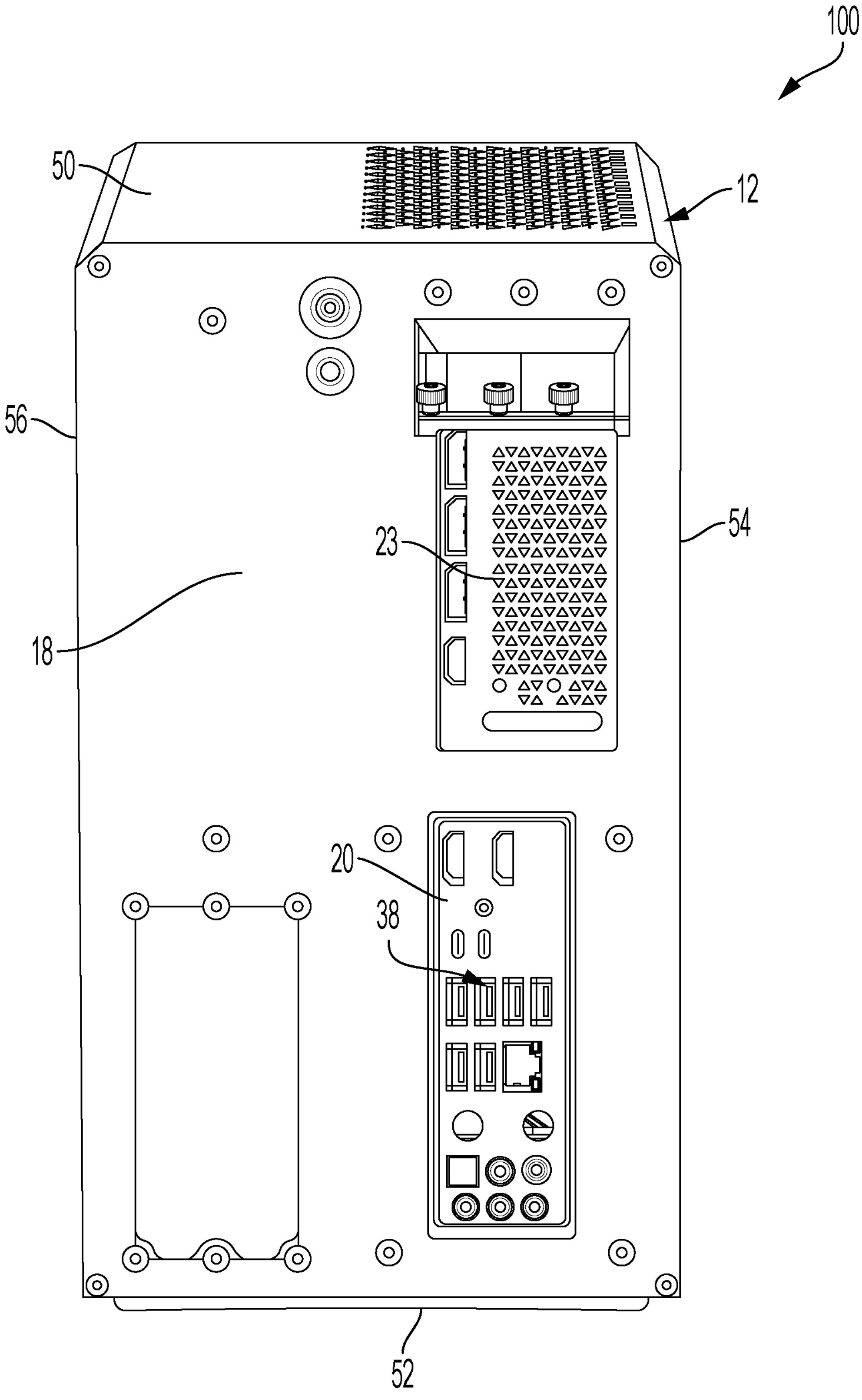
FIG. 13 is a rear view of a chassis for a computing device, according to some embodiments of the present disclosure.

Referring now to FIGS. 11-13, the device 100 is shown with the motherboard assembly 90 housed within the chassis 12, according to some embodiments of the present disclosure. In addition to the back panel 18, the chassis 12 may further include a sleeve 19. The sleeve 19 may be formed as an open box by a front panel 48, a top panel 50, a bottom panel 52, a right panel 54, and a left panel 56. The back panel 18 may be removably secured to (e.g., over the open portion of) the sleeve 19. When the back panel 18 is secured to the sleeve 19 as shown, the chassis 12 may form a box as suggested above. Owing to the aforementioned box shape, the back and front panels 18, 48 may be parallel (or substantially parallel), the top and bottom panels 50, 52 may be parallel (or substantially parallel), and the left and right panels 54, 56 may be parallel (or substantially parallel). Thus, the chassis 12 may form a box around the motherboard assembly 90.

Figure 14:
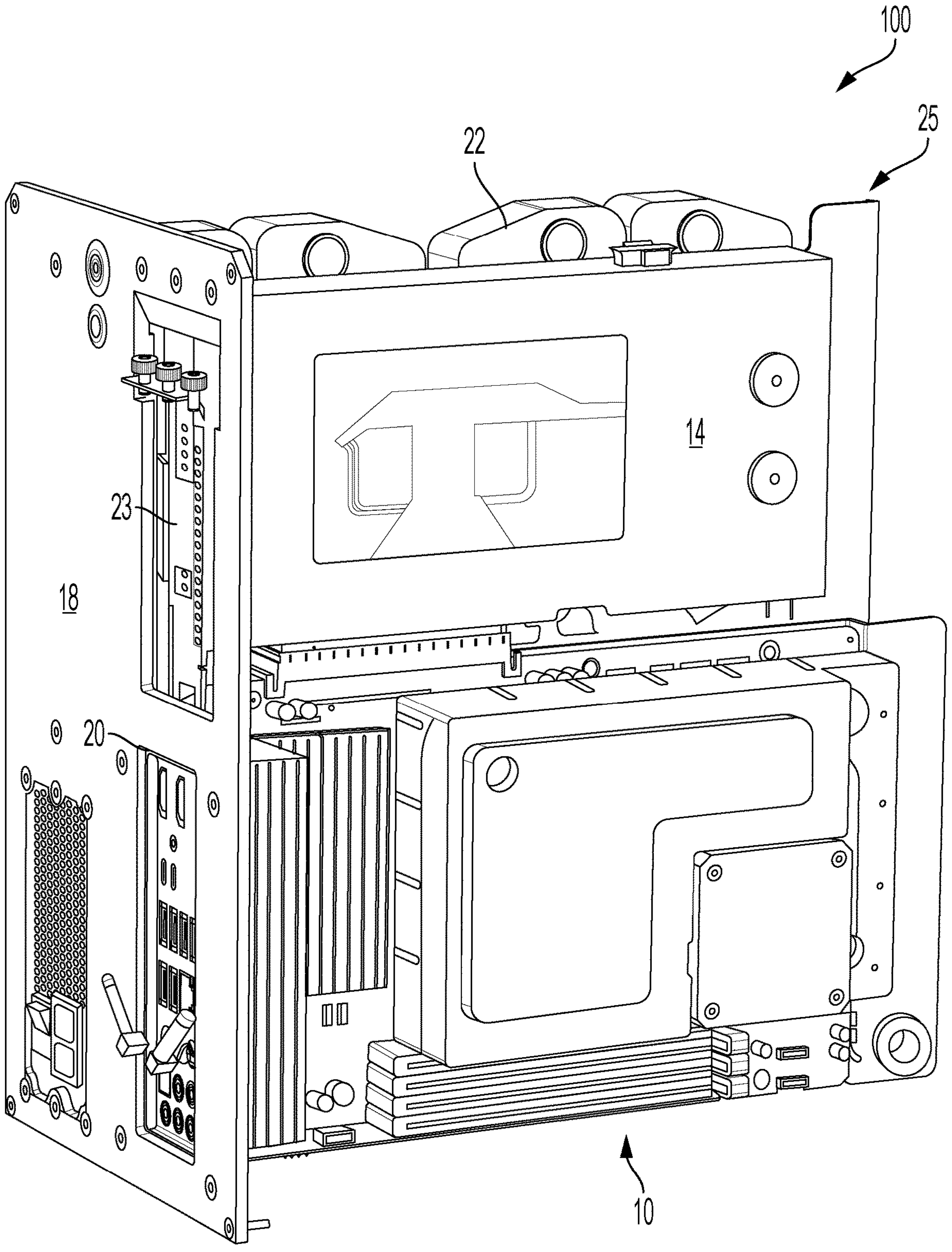
FIG. 14 is a rear perspective view of a motherboard for a computing device secured to a back panel of a chassis, according to some embodiments of the present disclosure.

Referring now to FIG. 14, the device 100 may include a removable motherboard insert 25, according to some embodiments of the present disclosure. For instance, the removable motherboard insert 25 may include the motherboard assembly 90 depicted with reference to FIGS. 3 and 10, a mounting panel 22, and, as suggested above, the back panel 18. In other embodiments, and as discussed in greater detail below, the removable motherboard insert 25 may include the motherboard assembly 90, a frame 80, and the back panel 18. Of course, the mounting panel 22 (or the frame 80, depending on the implementation) may be considered an internal component of the chassis 12. Thus, the chassis 12 may include the back panel 18, the sleeve 19, and the mounting panel 22 (or the frame 80, depending on the implementation). Such components may be secured to one another in any suitable combination. As a first example, the motherboard assembly 90 may be secured to the back panel 18 as depicted with reference to FIG. 10, and the back panel 18 may be secured to the mounting panel 22 (or the frame 80, depending on the implementation). As a second example, the motherboard assembly 90 may be secured to each of the mounting panel 22 (or the frame 80, depending on the implementation) and the back panel 18.

Figure 15:
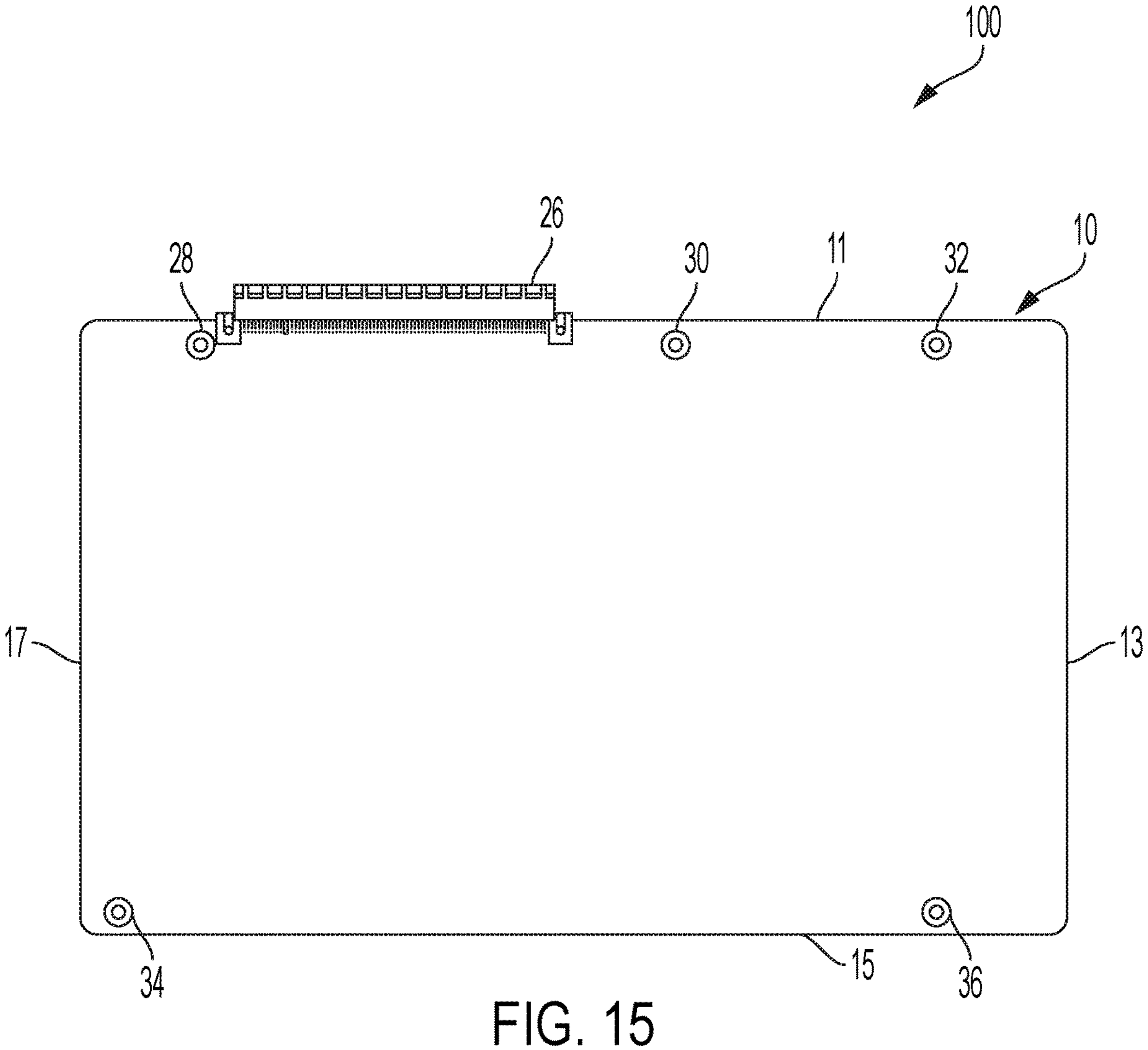
FIG. 15 is a side view of the motherboard of FIG. 1 with mounting holes, according to some embodiments of the present disclosure.

Referring now to FIG. 15, the motherboard assembly 90 may be secured to the mounting panel 22 via a number of mounting holes, according to some embodiments of the present disclosure. For instance, the motherboard 10 may include a first mounting hole 28, a second mounting hole 30, a third mounting hole 32, a fourth mounting hole 34, and a fifth mounting hole 36. As shown, the first, second, and third hole 28, 30, and 32 may be located along he first edge 11, while the fourth and fifth holes 34, 36 may be located along the third edge 15.

Figure 16:
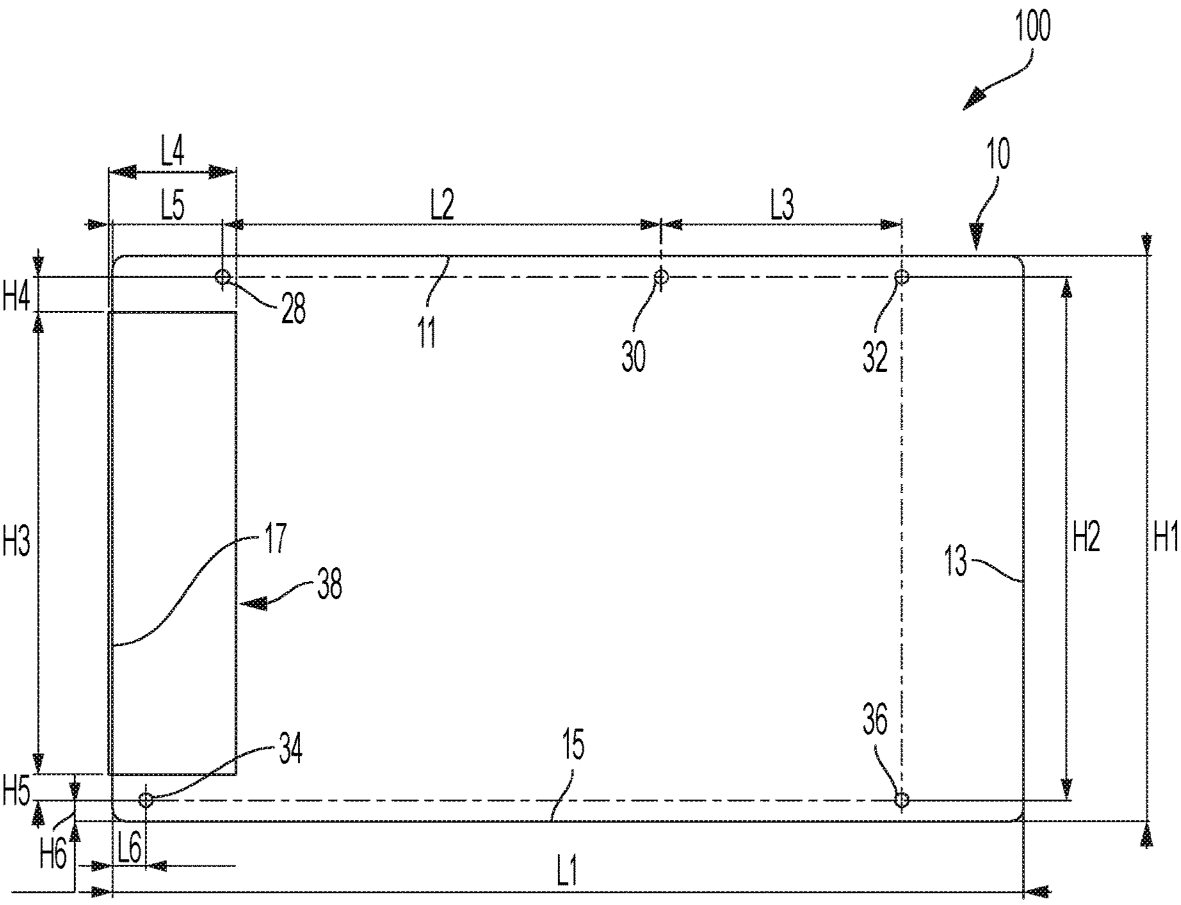
FIG. 16 is a dimensioned side view of the motherboard of FIG. 1 with mounting holes, according to some embodiments of the present disclosure.
Figure 17:
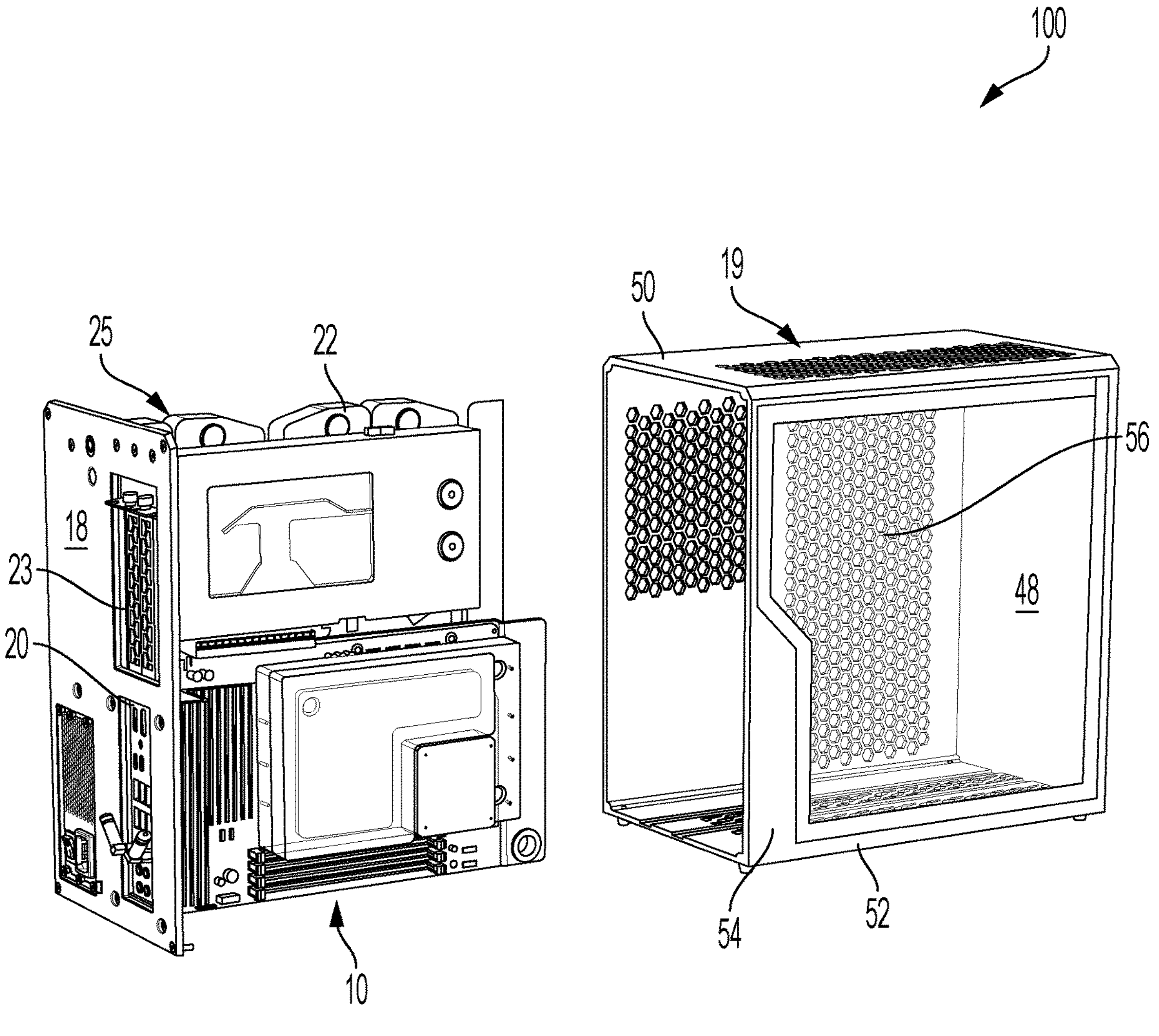
FIG. 17 is a rear perspective view of the motherboard of FIG. 14 and a sleeve for a chassis, according to some embodiments of the present disclosure.
Figure 18:
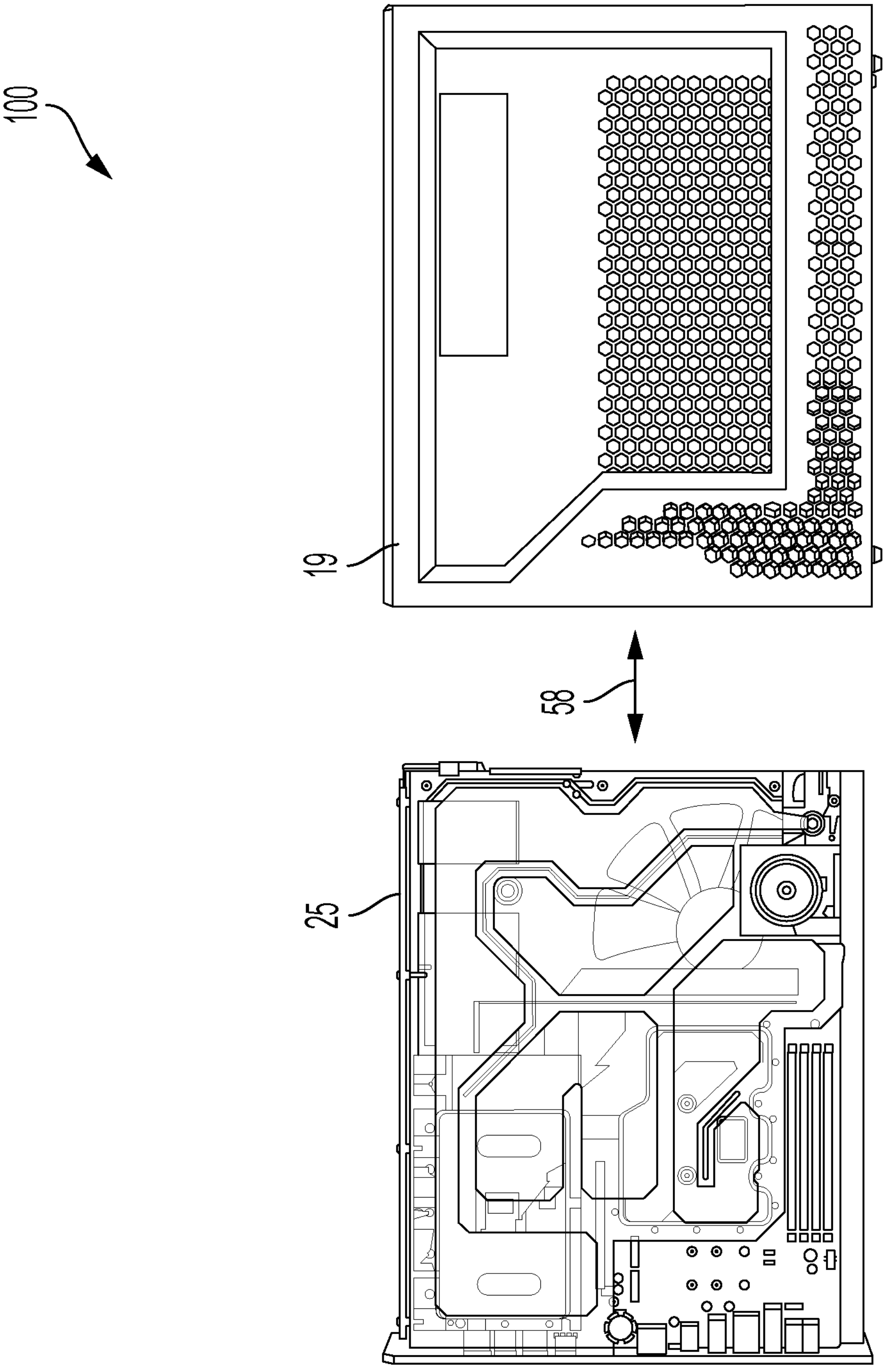
FIG. 18 is a side view of the motherboard of FIG. 14 and a sleeve for a chassis, according to some embodiments of the present disclosure.
Figure 19:
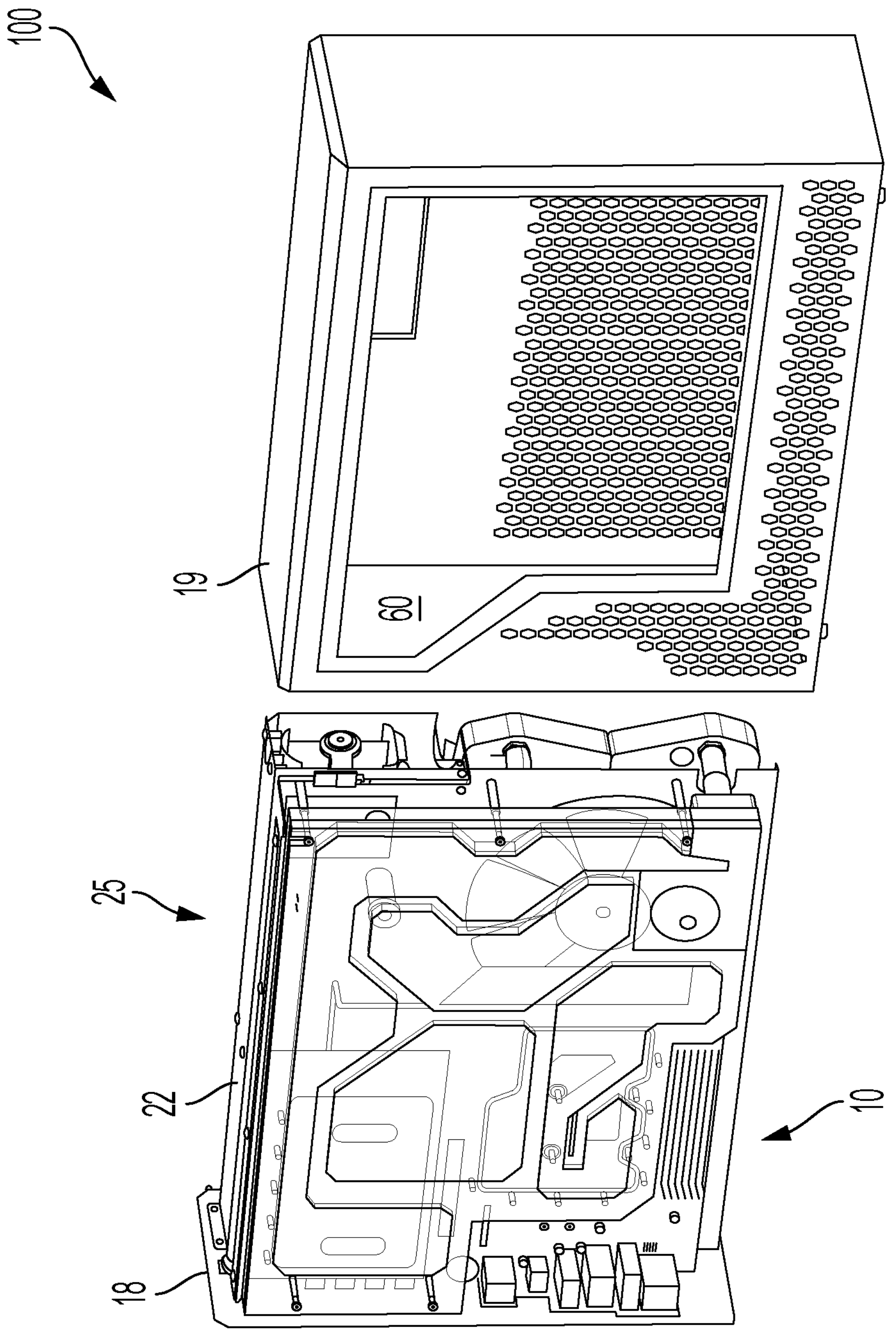
FIG. 19 is a front perspective view of the motherboard of FIG. 14 and a sleeve for a chassis, according to other embodiments of the present disclosure.
Figure 20:
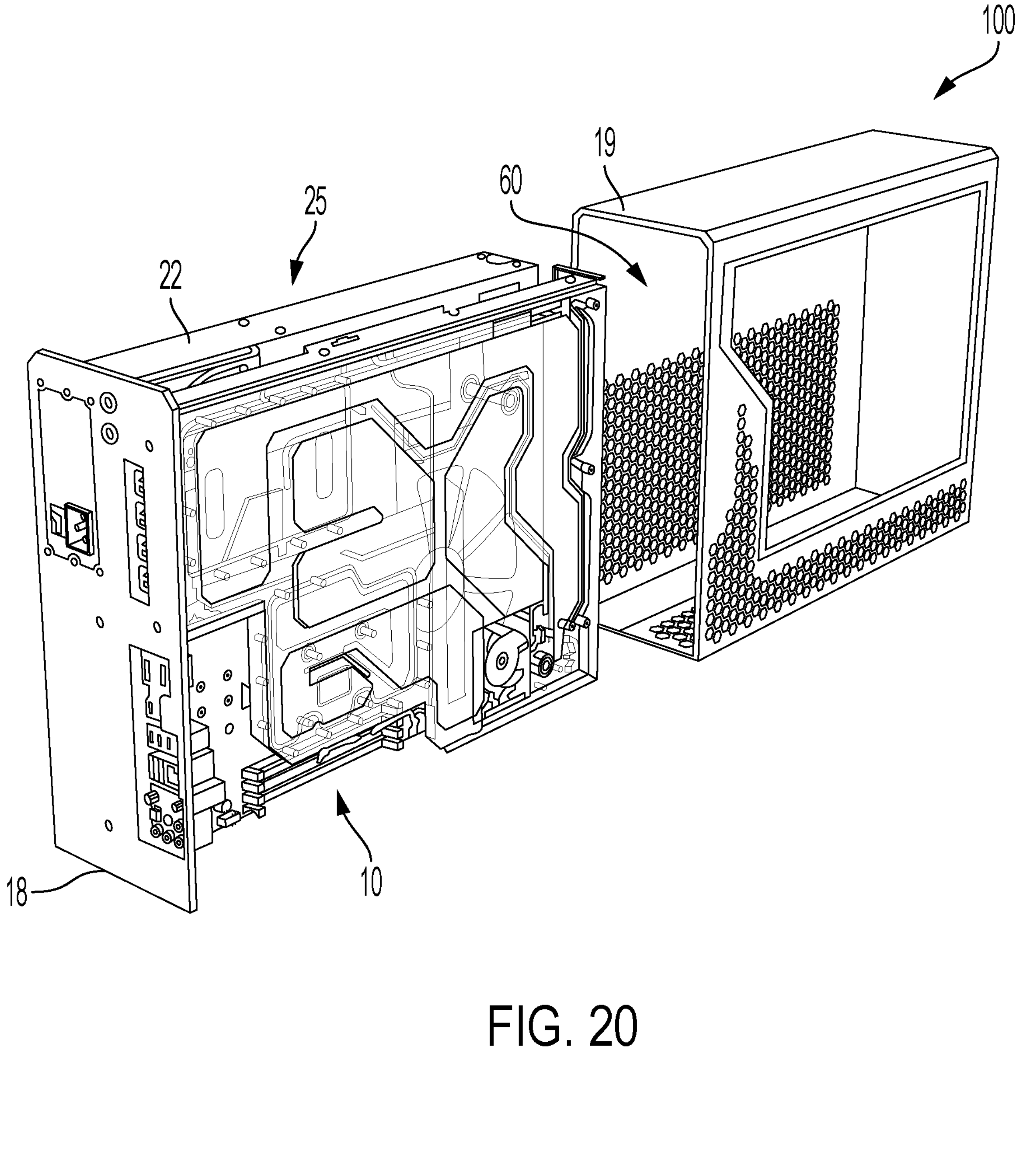
FIG. 20 is a rear perspective view of the motherboard of FIG. 14 and a sleeve for a chassis, according to additional embodiments of the present disclosure.

Referring now to FIG. 16, dimensions of the motherboard 10 are shown, according to some embodiments of the present disclosure. In some embodiments, a distance L1 between the first and third edges 11, 15 (e.g., the general span of the second and fourth edges 13, 17) is 9.6 inches. In some embodiments, a distance H1 between the second and fourth edges 13, 17 (e.g., the general span of the first and third edges 11, 15) is 10.78". In other embodiments, the distance H1 is 6.7 inches.

The first, second, and third mounting holes 28, 30, 32 may be horizontally aligned (e.g., aligned on an axis parallel to the first edge 11) and vertically offset from the first edge 11 by a length H6 of 0.25 inches. The fourth and fifth mounting hole 34, 36 may be horizontally aligned and vertically offset from the third edge 15 by H6.

The first, second, and third mounting hole 28, 30, 32 may be positioned above (e.g., closer to the expansion connector 26 relative to the fourth edge 17) the fourth and fifth mounting hole 34, 36, and be vertically offset from the fourth and fifth mounting hole 34, 36 by a distance H2 of 6.2 inches.

The first mounting hole 28 may be horizontally offset from the second mounting hole 30 by a length L2 of 5.2 inches. The third mounting hole 32 may be horizontally offset from the second mounting hole 30, where the second mounting hole 30 the middle mounting hole amongst the first, second, and third mounting hole 28, 30, 32, by a length L3 of 2.85 inches.

In some embodiments, the first mounting hole 28 may be horizontally offset from the fourth edge 17 by a length L5 of 1.5 inches. In particular, the length L5 may represent a distance between the fourth edge 17 and the nearest edge of the expansion connector 26. As suggested above with reference to FIG. 10, additional IO connectors may be disposed on the add-on card 14 (and secured by the IO shield 23). Such additional IO connectors may generally be vertically aligned with the fourth edge 17. In this sense, such IO connectors may necessitate a horizontal gap between the fourth edge 17 and the nearest edge of the add-on card 14.

Thus, the length L5 (as with any of the dimensions discussed herein) may be any dimension suitable for facilitating the apparatuses and methods discussed herein.

The fourth mounting hole 34 may be horizontally offset from the fourth edge 17 by a length L6 of 0.4 inches, and be positioned to the left of the fifth mounting hole 36. The fourth mounting hole 34 may be horizontally offset from the fifth mounting hole 36 by a length of 5.8 inches.

The IO connectors 38 may be arranged such that they are generally positioned on a rectangular region that is lower than, and vertically offset from the first, second, and third mounting hole 28, 30, 32 by a length H4 of 0.4 inches. The external connectors may be higher than, and vertically offset from the fourth and fifth mounting holes 34, 36 by a length H5 of 0.3 inches. The external connectors may be arranged such that, horizontally, the are generally aligned with the fourth edge 17 and extend onto the motherboard 10 by a length L4 of 1.5 inches.

Of course, as suggested above with reference to the length L5, the various dimensions described herein are merely exemplary in nature. It should be appreciated that the dimensions of the motherboard 10; the first, second, third, fourth, and fifth mounting holes 28, 30, 32, 34, 36; the IO connectors 38; and any other component of the device 100 discussed herein may be dimensioned or arranged in any suitable format in order to provide the advantages discussed herein.

Referring now to FIGS. 17-20, the device 100 is shown to depict the removal of the removable motherboard insert 25 from, or insertion of the same into, the sleeve 19, according to some embodiments of the present disclosure. As suggested above, the sleeve 19 may be arranged such that an opening 60 is left where the back panel 18 would otherwise be. The dimensions of the removable motherboard insert 25 may be arranged such that the removable motherboard insert 25 is insertable within the sleeve 19. Generally, this advantageously provides access to the motherboard 10 in a manner that may not require significant steps or manual labor, such as disassembling a side panel, as may be the case in conventional computing devices.

Figure 21:
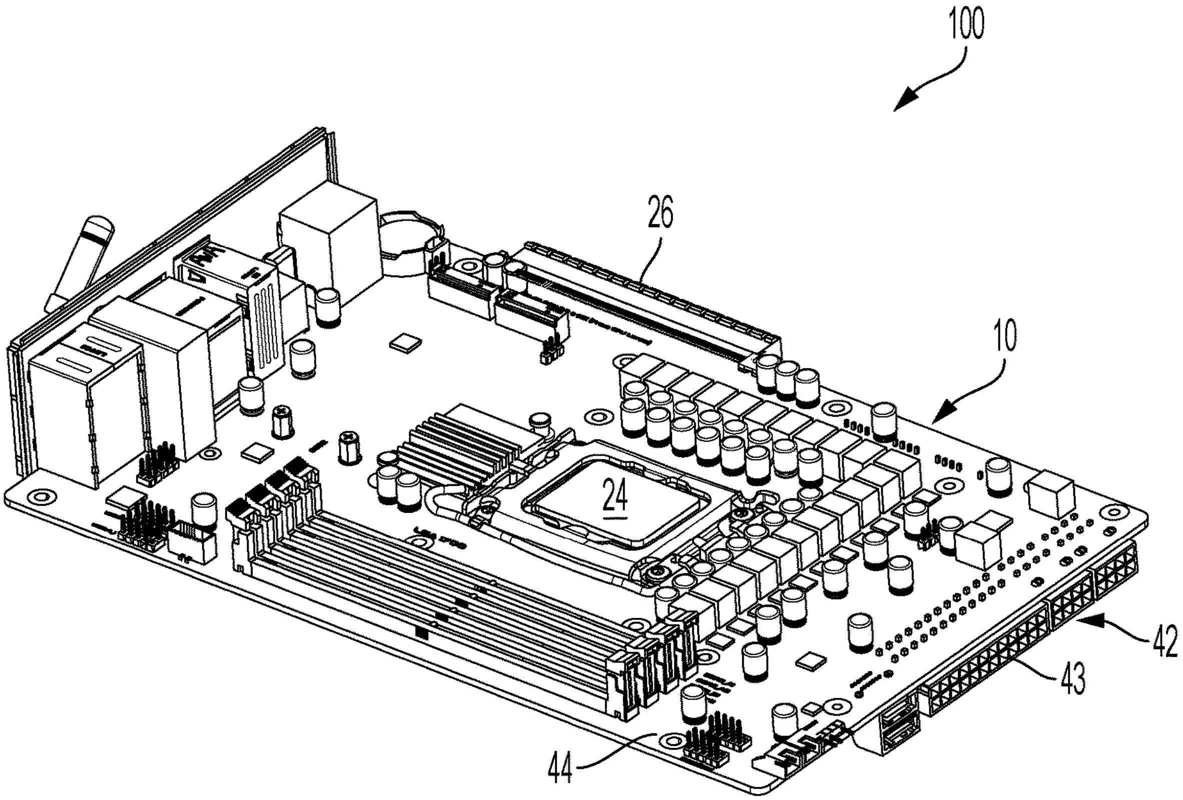
FIG. 21 is a perspective view of a motherboard for a computing device with a power connector, according to some embodiments of the present disclosure.
Figure 22:
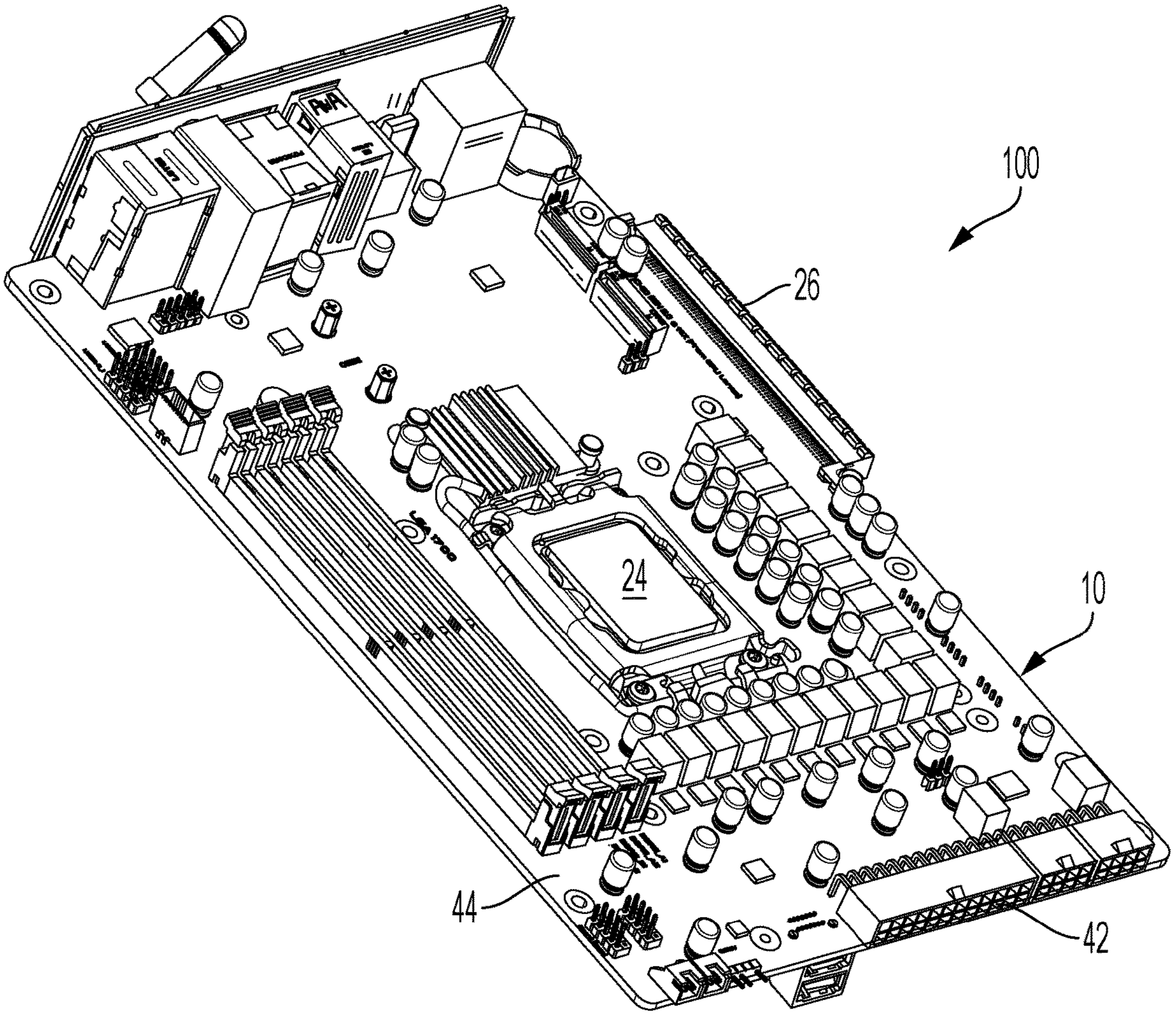
FIG. 22 is a perspective view of a motherboard for a computing device with a power connector, according to alternative embodiments of the present disclosure.

Referring now to FIGS. 21 and 22, the motherboard 10 of device 100 is shown, according to additional embodiments of the present disclosure. The device 100 may include a power connector 42. The power connector 42 may be disposed on the motherboard 10 along the second edge 13, and include one or more power connector slots 43 oriented parallel relative to the motherboard 10 (similar to the discussion of the expansion connector 26 above). The power connector 42 may face in an opposite direction relative to the one or more IO connectors 38, thus facing the front panel 48 of the chassis. By orienting the power connector 42 as such, any cabling required to bridge between the power connector 42 and an external power supply may not be required to undergo as many contours that are typically required in conventional computing systems. Depending on the implementation, the power connector 42 may be disposed on the first (e.g., top) face 44 of the motherboard 10 (as shown with reference to FIG. 20), the second (e.g., bottom) face 46 of the motherboard 10, or in some other suitable configuration.

Figure 23:
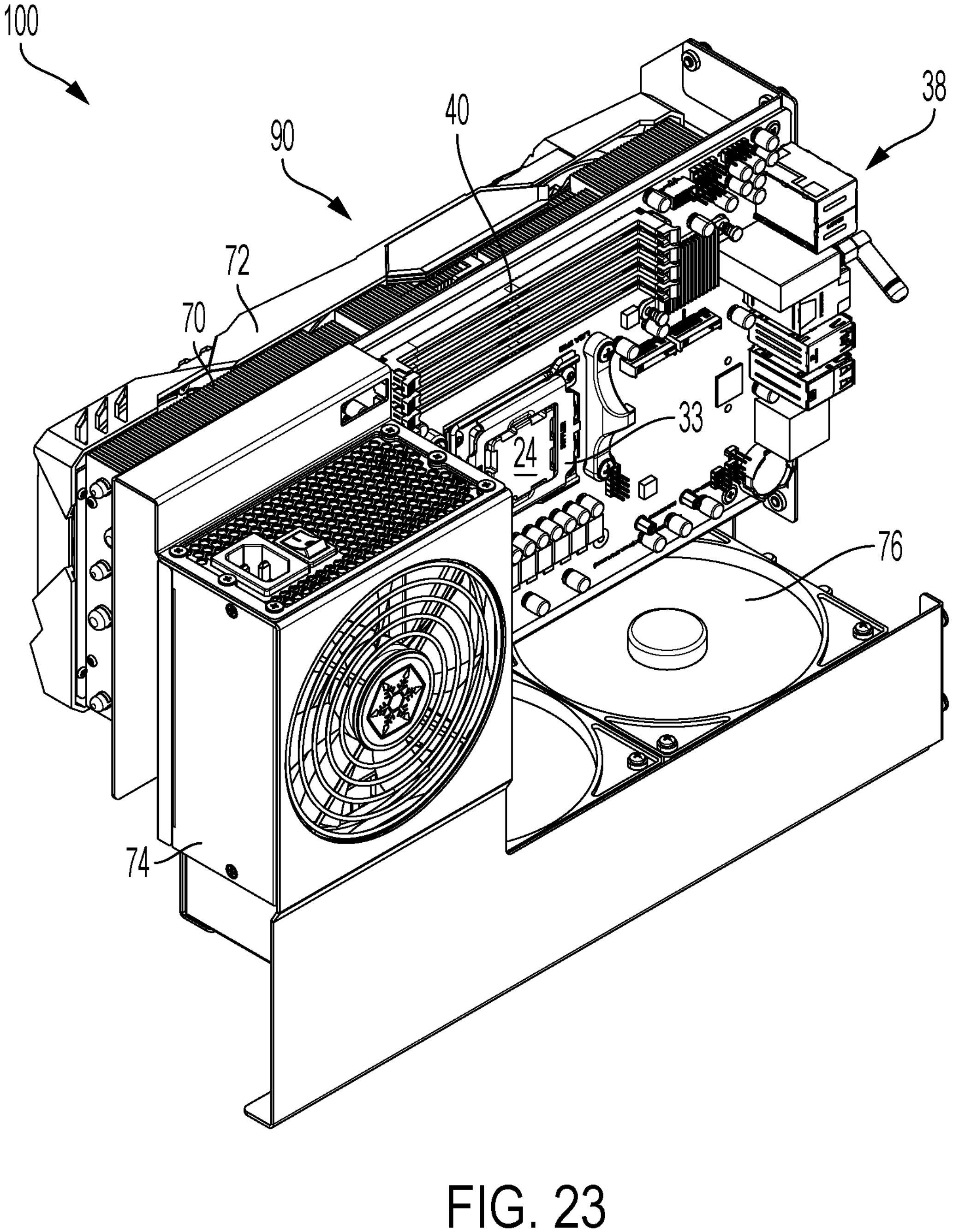
FIG. 23 is an upper perspective view of a motherboard for a computing device, according to further embodiments of the present disclosure.
Figure 24:
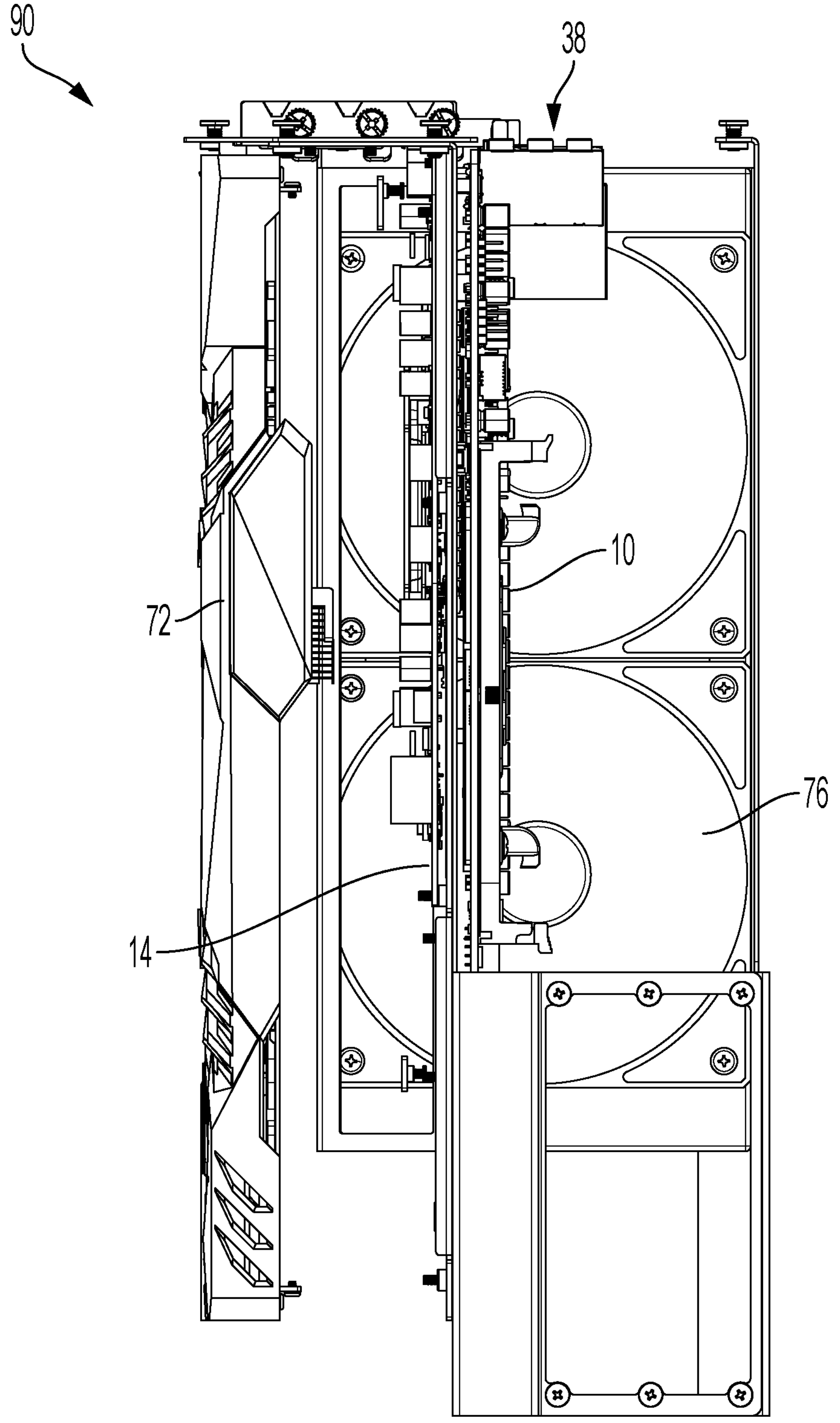
FIG. 24 is an upper view of a motherboard for a computing device with an add-on card connected thereto, according to further embodiments of the present disclosure.

Referring now to FIGS. 23 and 24, the motherboard assembly 90 of the device 100 is shown, according to further embodiments of the present disclosure. As mentioned above, the motherboard assembly 90 may include the motherboard 10 and the add-on card 14, each of which may be oriented vertically. As shown with additional reference to FIG. 29, the motherboard 10 may include the one or more motherboard circuity components 21 (such as the CPU 24), and the motherboard may include the one or more add-on card components 29. In some embodiments, the device 100 further includes a radiator 70, fans 72, a power supply 74, and a coolant supply 76.

Figure 25:
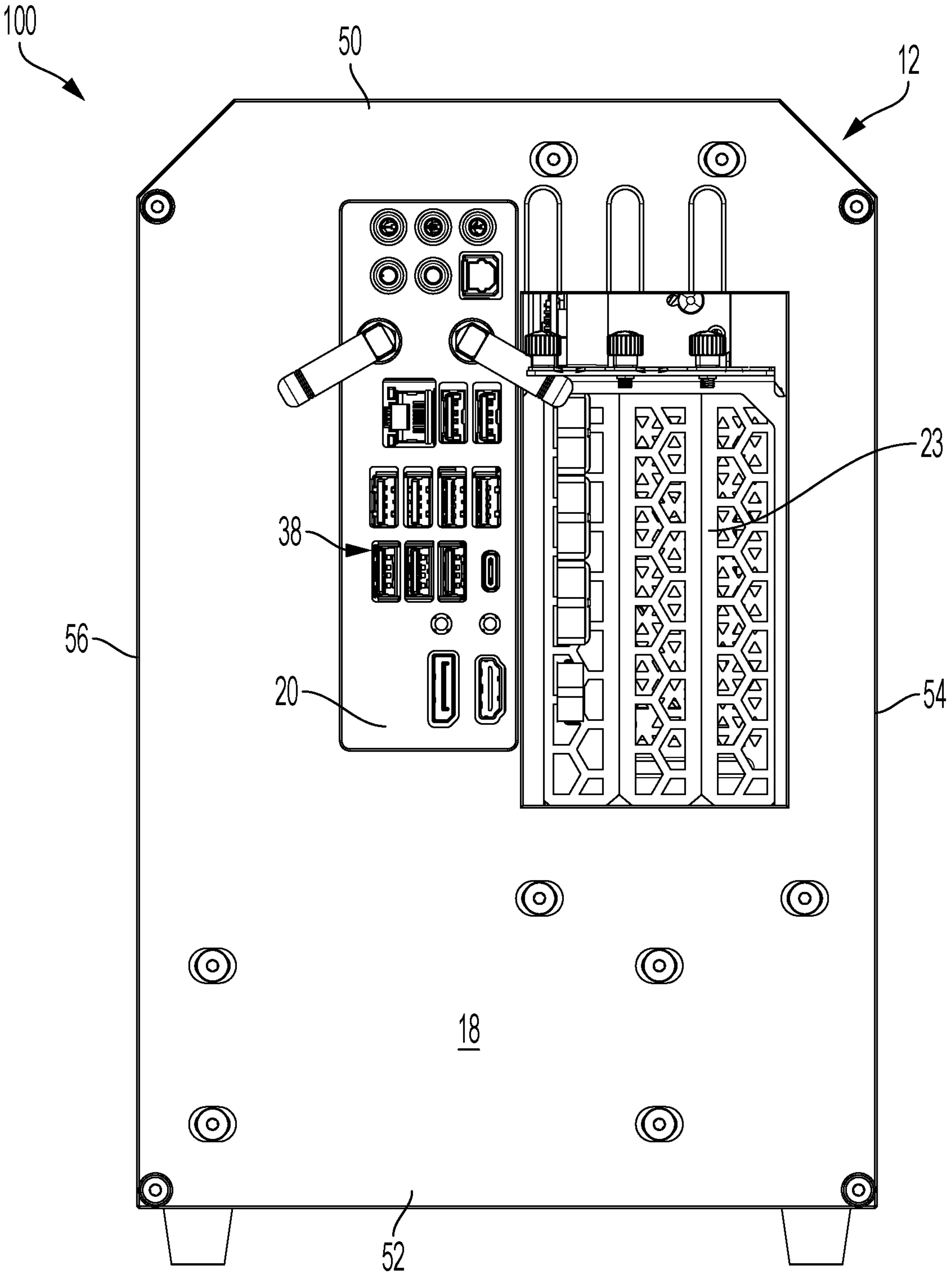
FIG. 25 is a rear view of chassis for a computing device, according to further embodiments of the present disclosure.

Referring now to FIG. 25, the chassis 12 of the device 100 is shown, according to some embodiments of the present disclosure. As discussed above, the motherboard assembly 90 may be secured to the chassis 12, or a portion of thereof (e.g., the back panel 18). For instance, the chassis 12 may include the back panel 18, on which the motherboard 10 and/or the add-on card 14 (e.g., the motherboard assembly 90) may be mounted on or otherwise secured. As discussed above, the motherboard 10 and/or the add-on card 14 may be oriented perpendicular to the back panel 18. In some embodiments, the back panel 18 includes the IO shield 23. Depending on the implementation, the IO shield 23 may include (or be) a vent that is aligned with the add-on card 14.

Figure 26:
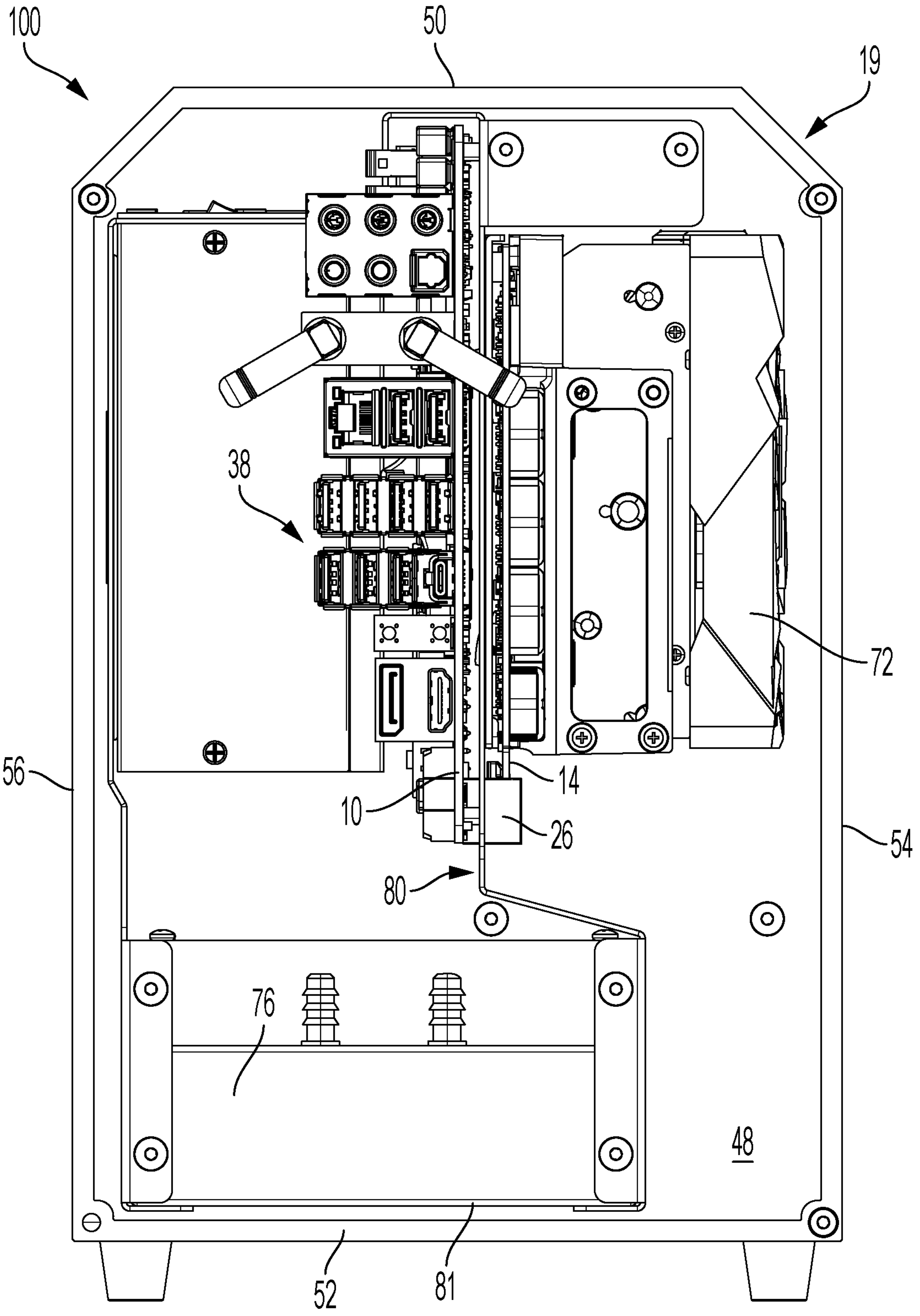
FIG. 26 is a rear internal view of chassis for a computing device, according to further embodiments of the present disclosure.
Figure 27:
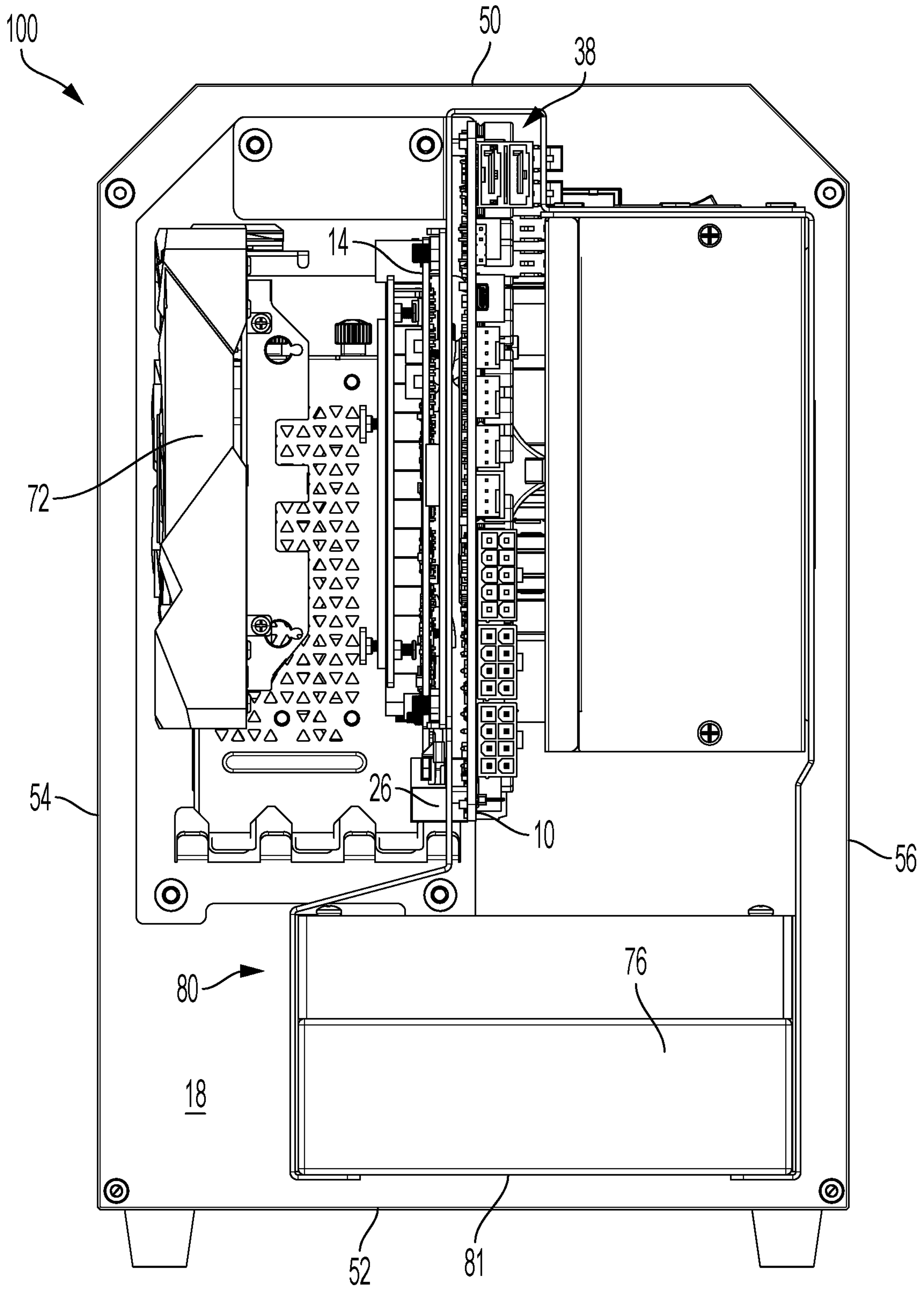
FIG. 27 is a front internal view of a chassis for a computing device, according to further embodiments of the present disclosure.

Referring now to FIGS. 26 and 27, front and rear views of the device 100 (respectively) are shown, according to further embodiments of the present disclosure. In some embodiments, the add-on card 14 is positioned between (e.g., laterally between) the motherboard 10 and the fans 72. For instance, rather than being positioned above the motherboard 10 as discussed above, the add-on card 14 may still be oriented parallel to, but be positioned on either side of the motherboard 10 (e.g., adjacent to the first or second faces 44, 46 of the motherboard 10). Further, the motherboard 10 and the add-on card 14 may be positioned above the coolant supply 76, which may be fluidly coupled to the radiator 70 shown with reference to FIG. 23. Depending on the implementation, the radiator 70 may be positioned between (e.g., laterally between) the add-on card 14 and the fans 72. Advantageously, the fans 72 may be operated to drawn heat from both the motherboard 10 and the add-on card 14 (particularly given their parallel and adjacent arrangement), and through the radiator 70.

Figure 28:
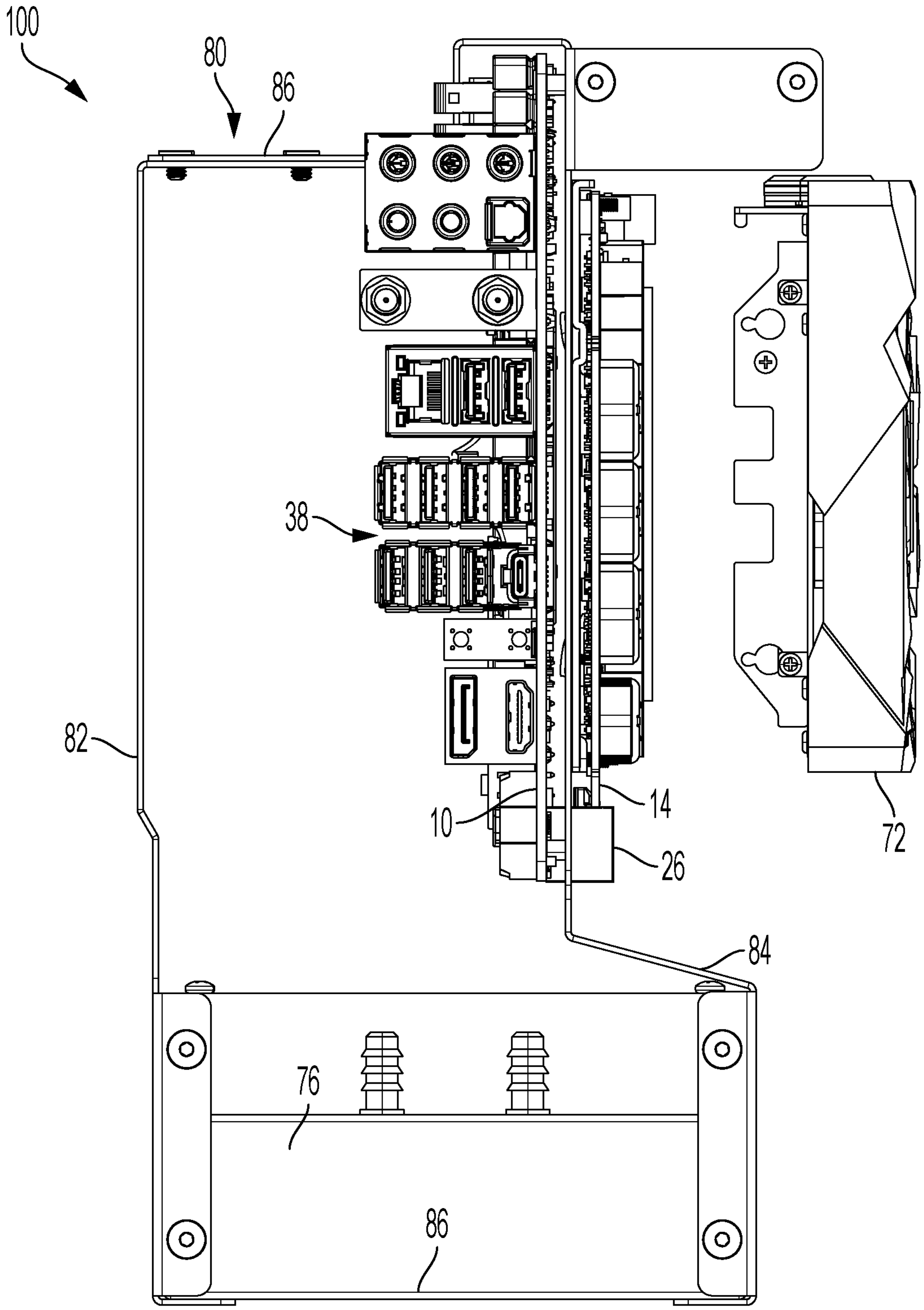
FIG. 28 is a rear view of a motherboard and add-on card for a computing device secured to a frame, according to further embodiments of the present disclosure.
Figure 29:
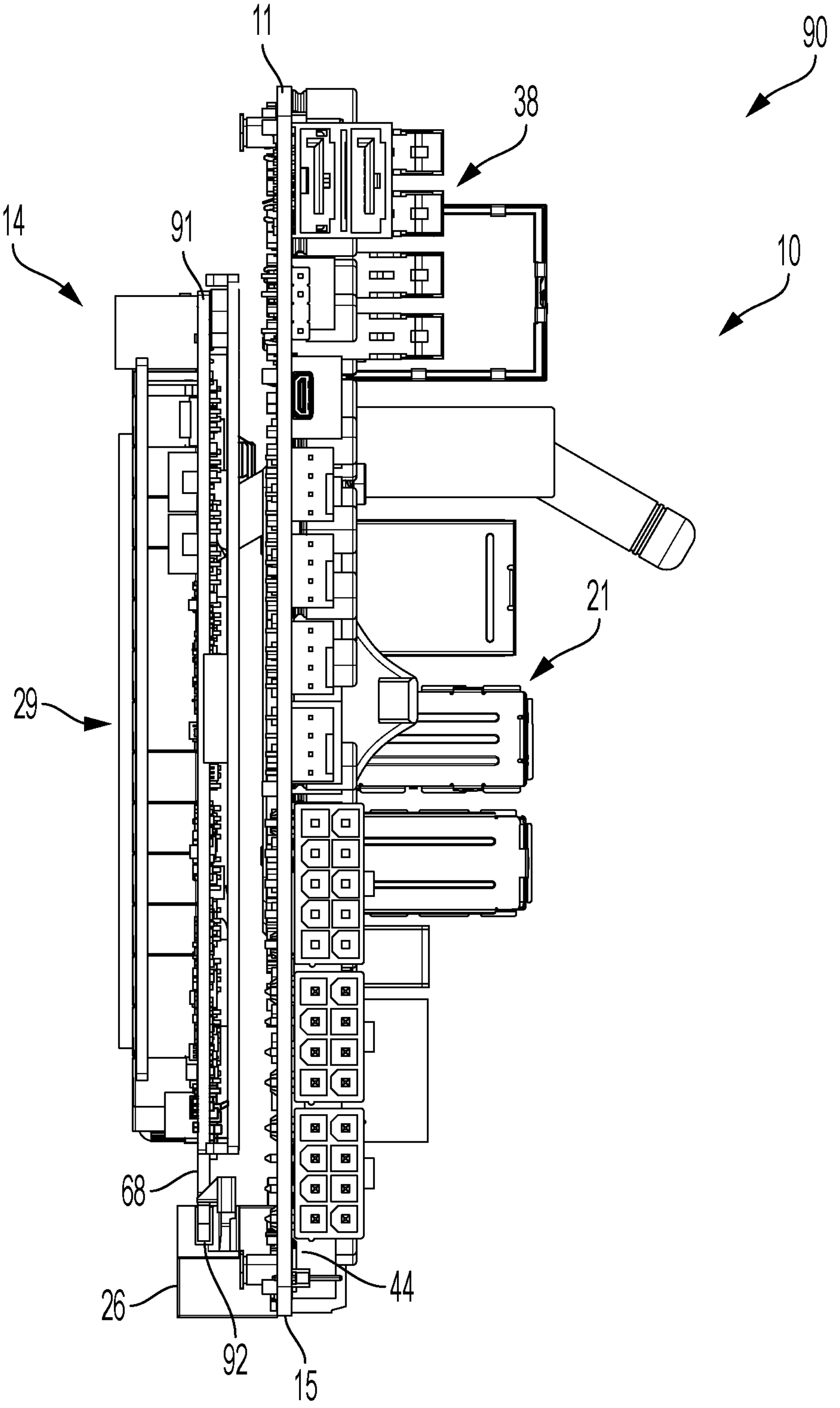
FIG. 29 is a front view of a motherboard for a computing device with an add-on card connected thereto, according to further embodiments of the present disclosure.
Figure 30:
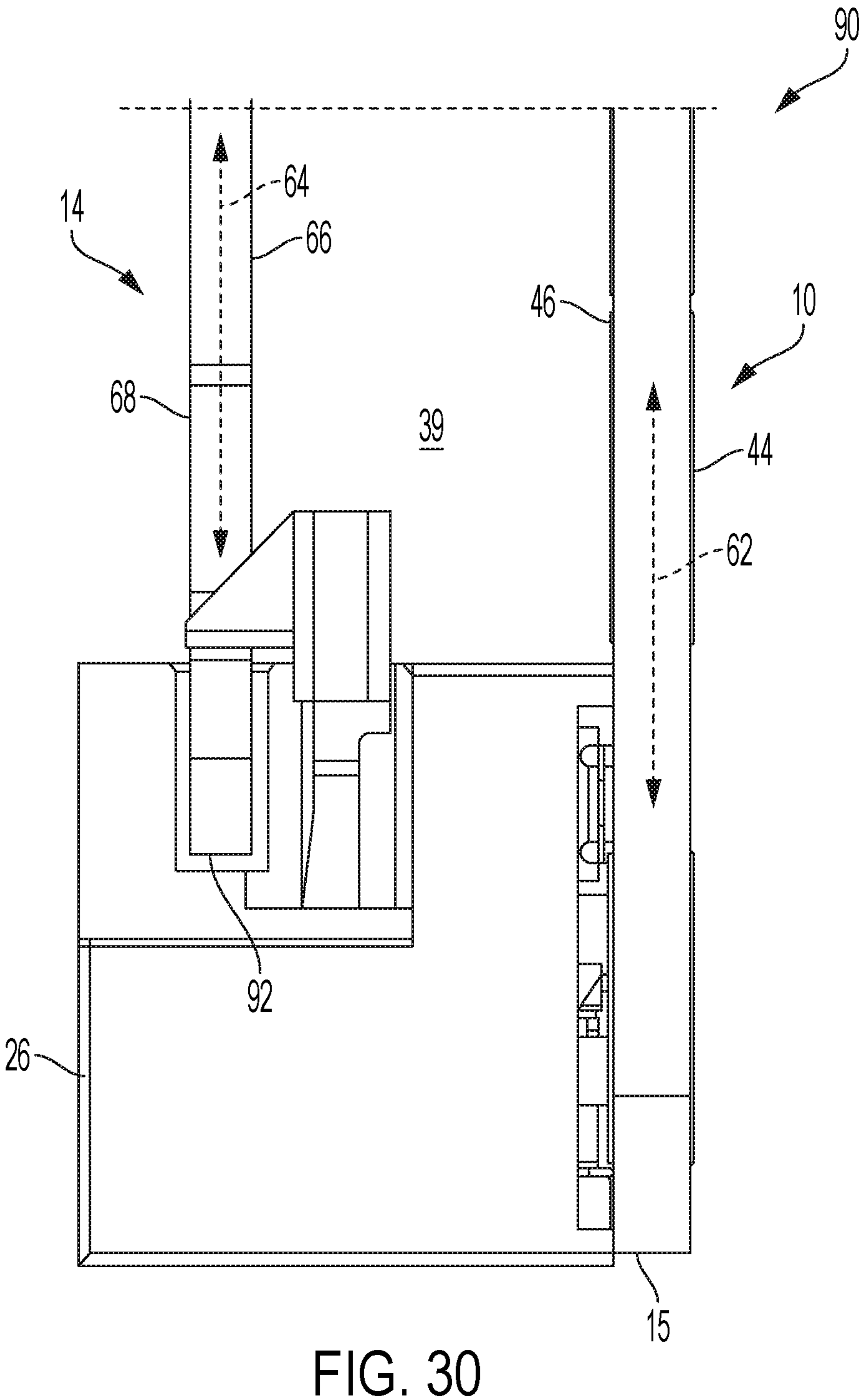
FIG. 30 is a detailed partial rear view of a motherboard for a computing device with an add-on card connected thereto, according to further embodiments of the present disclosure.
Figure 31:
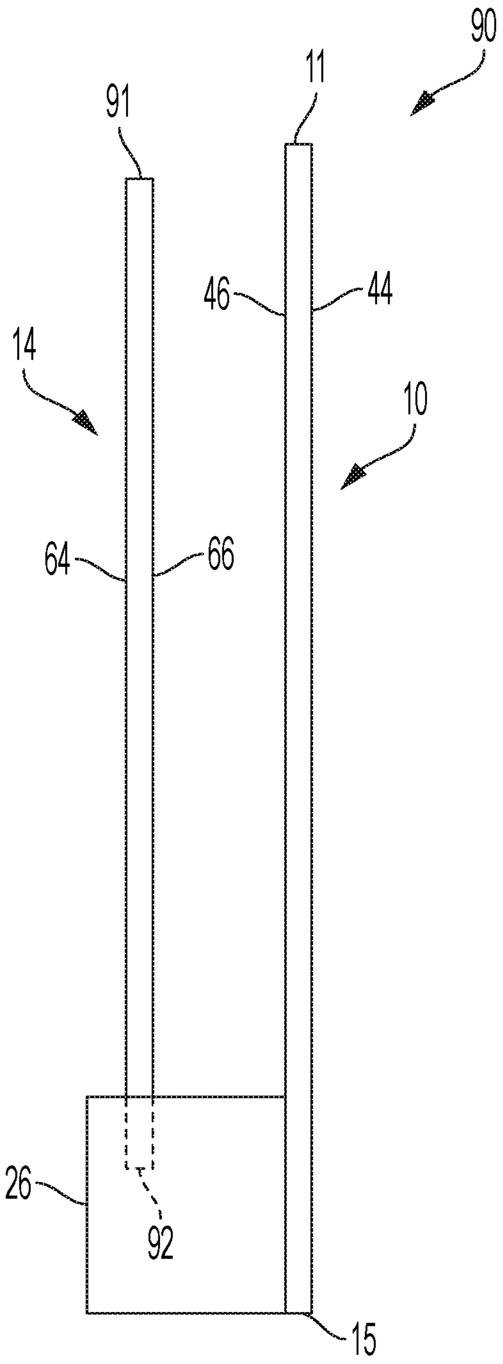
FIG. 31 is a schematic rear view of a motherboard for a computing device with an add-on card connected thereto, according to further embodiments of the present disclosure.
Figure 32:
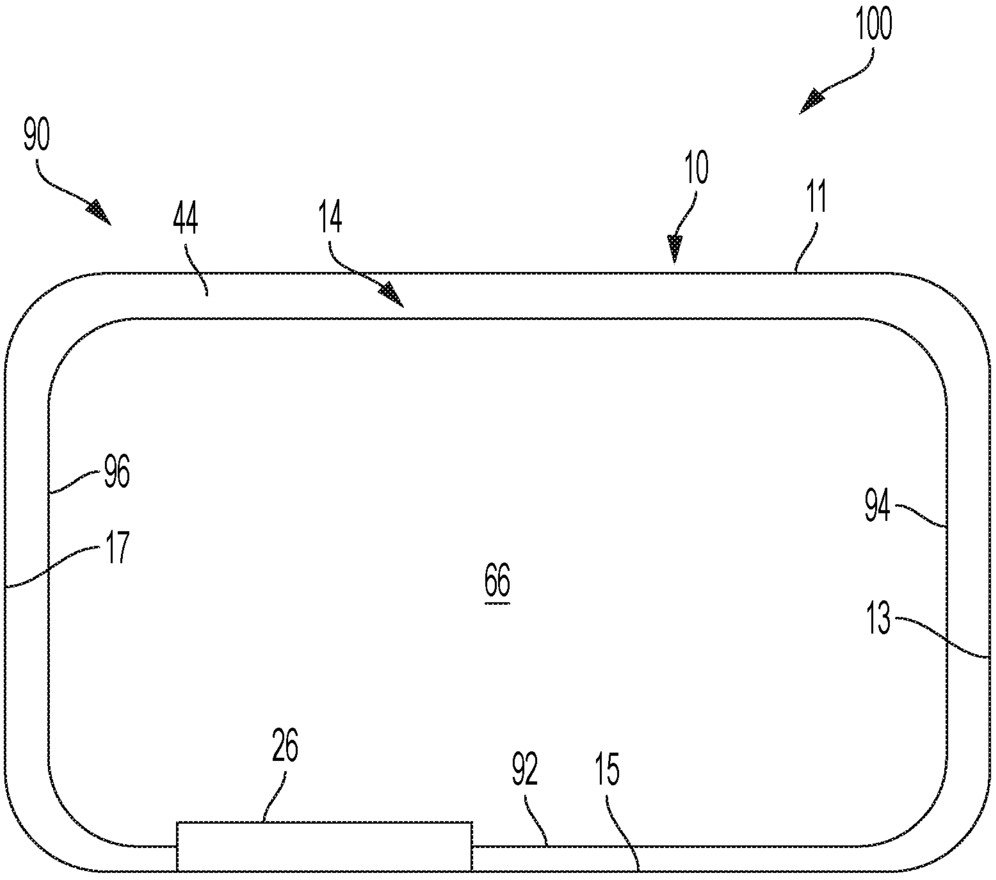
FIG. 32 is a schematic side view of a motherboard for a computing device with an add-on card connected thereto, according to further embodiments of the present disclosure.
Figure 33:
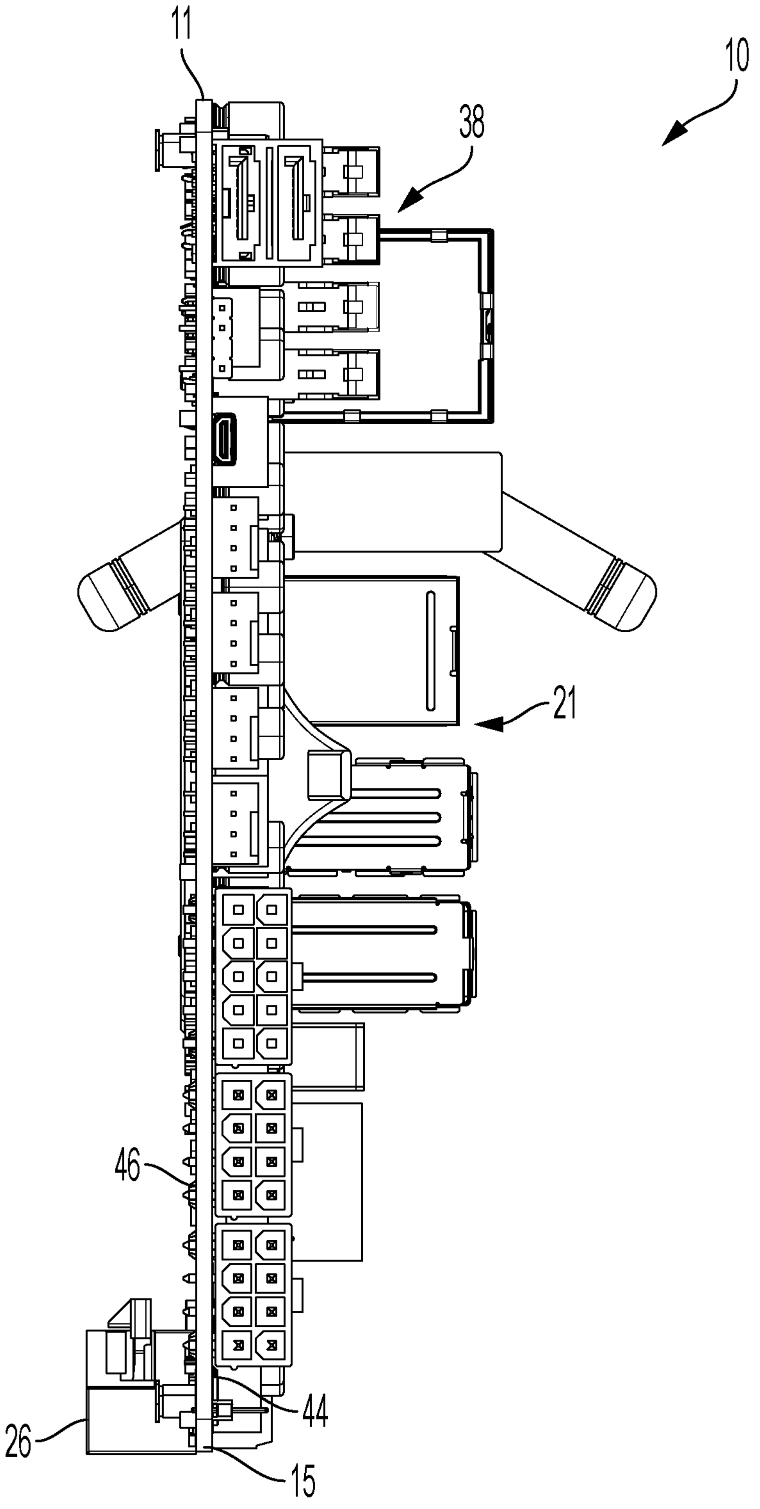
FIG. 33 is a rear view of a motherboard and an expansion connector for a computing device, according to further embodiments of the present disclosure.
Figure 34:
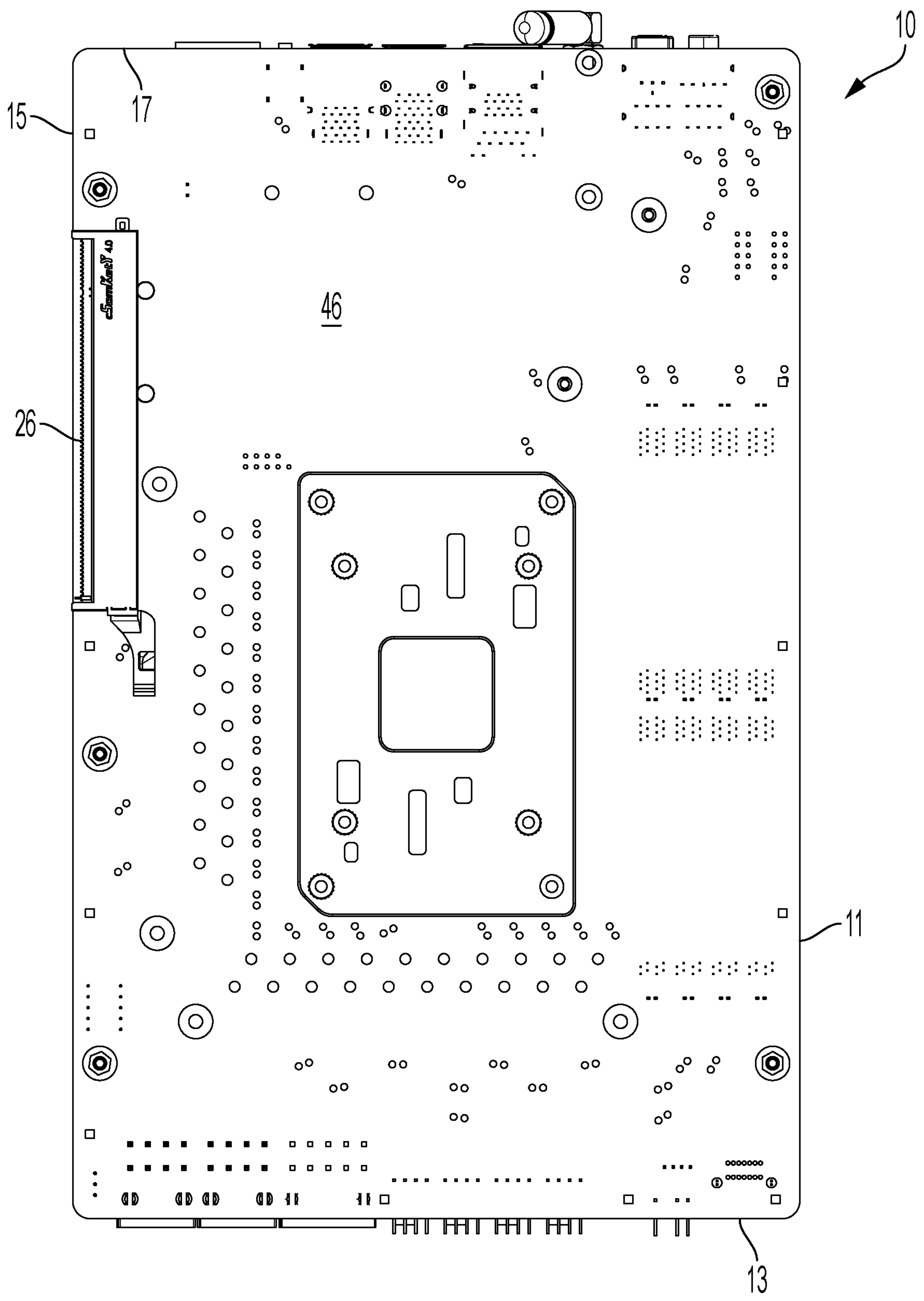
FIG. 34 is a side view of a motherboard and an expansion connector for a computing device, according to further embodiments of the present disclosure.
Figure 35:
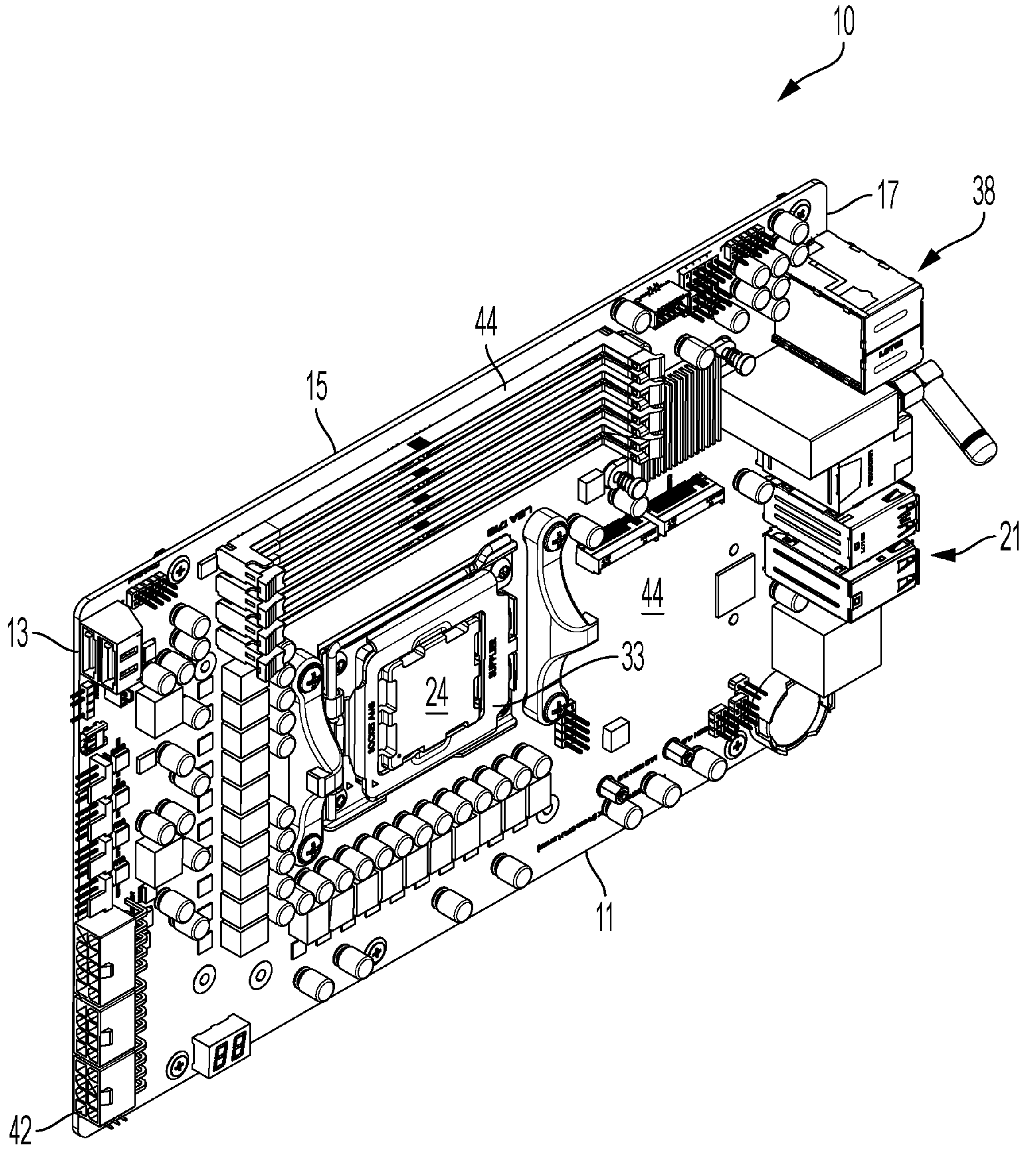
FIG. 35 is a side perspective view of a motherboard for a computing device, according to further embodiments of the present disclosure.
Figure 36:
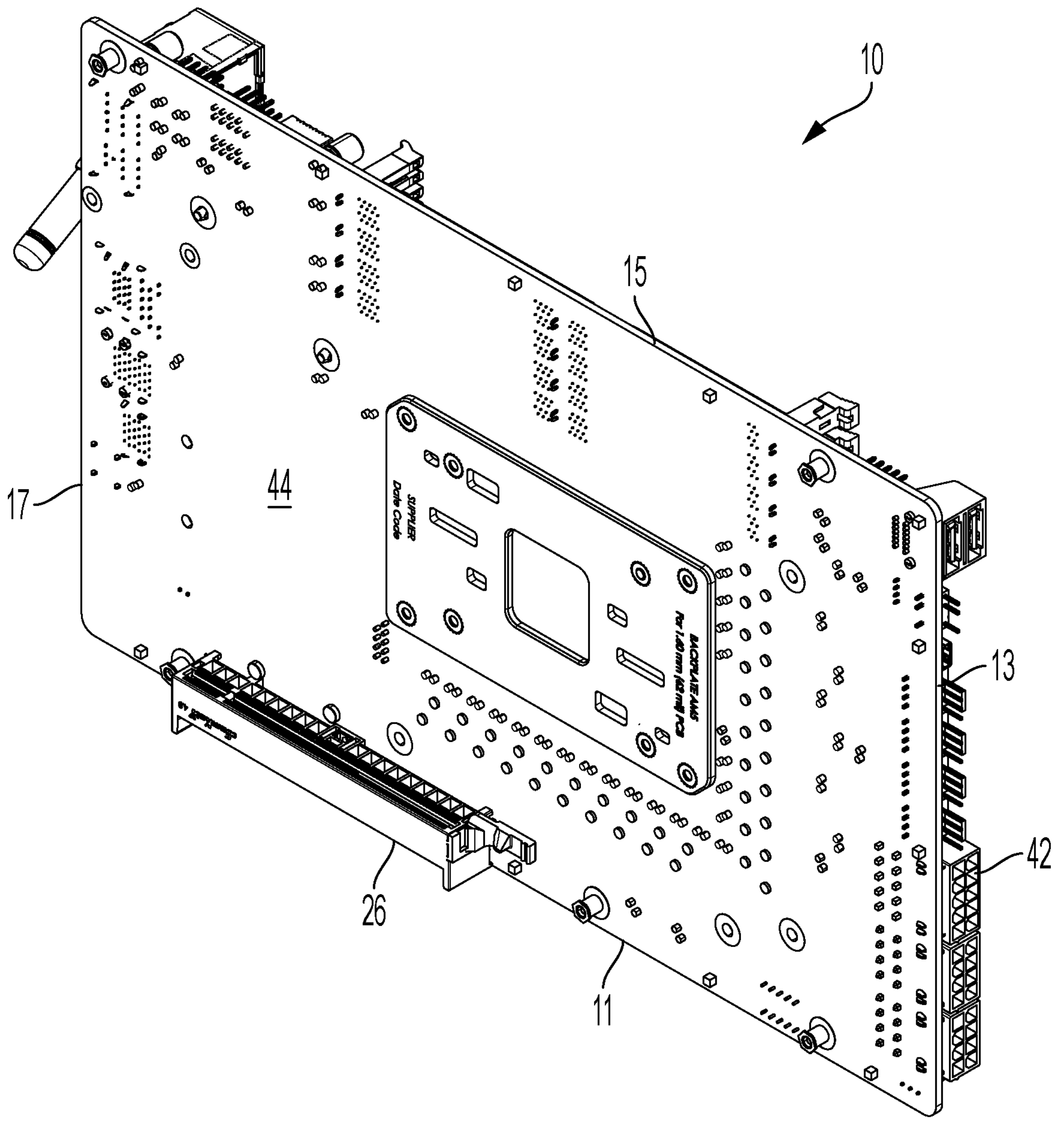
FIG. 36 is a side perspective view of a motherboard and an expansion connector for a computing device, according to further embodiments of the present disclosure.

Referring now to FIG. 28, the device 100 may include the frame 80 supporting the motherboard 10 and the add-on card 14, according to further embodiments of the present disclosure. In such embodiments, the motherboard 10 and the add-on card 14 are supported by the frame 80, in a manner similar to that discussed above with reference to the mounting panel 22. For example, the frame 80 may include a first vertical bracket 82, a second vertical bracket 84, and a top bracket 86 attaching the first and second vertical brackets 82, 84. The first and second vertical brackets 82, 84 may be disposed on and extend upwardly from a base 81 of the frame 80 (or, depending on the implementation, the coolant supply 76). As shown, the motherboard 10 and the add-on card 14 may be disposed on the second vertical bracket 84, and the second vertical bracket 84 may be stabilized by the first vertical bracket 82 and/or the top bracket 86.

In some embodiments, the frame 80 is, or is arranged similar to, the mounting panel 22 discussed above with reference to FIG. 14. In this sense, the removable motherboard insert 25 discussed above may include the motherboard assembly 90, the frame 80 (which may be considered an internal component of the chassis 12), and the back panel 18. The back panel 18 may be attached to (or rigidly connected to) the frame 80, thereby allowing the motherboard insert 25 to be secured within the sleeve 19 as discussed above.

Referring now to FIGS. 29-32, the motherboard assembly 90 is shown in greater detail, according to further embodiments of the present disclosure. As mentioned above, the motherboard 10 may include the first edge 11, the second edge 13, the third edge 15, and the fourth edge 17. Furthermore, the device 100 may include the expansion connector 26 disposed on the motherboard 10. As discussed above and as shown in additional detail with reference to FIG. 37, the expansion connector 26 may include the one or more expansion connector slots 27. In some embodiments, and as shown with additional reference to FIGS. 33-36, the expansion connector 26 is disposed on one of the first or second faces 44, 46 of the motherboard 10 (rather than straddling one of the edges of the motherboard 10 as discussed above).

In some embodiments, the expansion connector slots 27 are oriented towards the first edge 11 of the motherboard 10 (e.g., from a vertical perspective). Further, the expansion connector slots 27 may be oriented upwards and away from the third edge 15 (e.g., from a vertical perspective). For example, the expansion connector 26 may be disposed on the second face 46 of the motherboard 10, along the third edge 15 (e.g., at a bottom end of the motherboard 10). In this sense, and as shown in greater detail with additional reference to FIGS. 33-36, the expansion connector 26 may be disposed at the bottom end of the motherboard 10, and may be oriented vertically upwards in the direction of the first edge 11 (e.g., towards a top end of the motherboard 10).

In some embodiments, the one or more expansion connector slots 27 may be oriented substantially parallel to (e.g., forming an angle of no more than ten degrees relative to) the motherboard 10 (or, more particularly, some or all of the first face 44, the second face 46, and the motherboard axis 62). In particular, the one or more expansion connectors slots 27 may be oriented parallel to (e.g., fully parallel to, such that no such angle is formed between the orientation of the one or more expansion connector slots 27 and) the motherboard 10 (or, more particularly, some or all of the first face 44, the second face 46, and the motherboard axis 62). For example, as discussed above, the motherboard 10 may include the first face 44, which may be planar, and thus considered a "first planar face 44." In turn, the one or more expansion connector slots 27 may be oriented in parallel to the first planar face 44. Furthermore, the motherboard 10 may define the motherboard axis 62, and the one or more expansion connector slots 27 may be oriented parallel or substantially parallel to the motherboard axis 62.

In some embodiments, the one or more expansion connector slots 27 are positioned offset from the motherboard 10. For example, as discussed above, the motherboard 10 may include the first planar face 44 and the second planar face 46, which may be planar, and thus be considered a "second planar face 46." In some embodiments, the one or more expansion connector slots 27 may be offset from the second planar face 46, and be laterally positioned closer to the second planar face 46 than the first planar face 44. In this sense, the expansion connector 26 may be disposed on the second planar face 46 of the motherboard 10). As discussed in greater detail below, such offset positioning of the one or more expansion connector slots 27 may facilitate a corresponding parallel (or substantially parallel) orientation and offset position of the add-on card 14 relative to the motherboard 10. As mentioned above, the device 100 may include the socket 33 disposed on the motherboard 10, which may be configured to receive the CPU 24. In some embodiments, the socket 33 is positioned on the first face 44, such that the CPU 24 is (and other motherboard components 21 are) positioned on an opposite lateral side of the motherboard 10 relative to the expansion connector 26.

As mentioned above, the device 100 may include the add-on card 14, which may be disposed on the expansion connector 26 (e.g., electrically coupled via the one or more expansion connector slots 27). In such further embodiments, the add-on card 14 is oriented to extend (e.g., vertically extend) towards the first edge 11 of the motherboard 10 (e.g., extend towards a top end of the motherboard 10). For example, as mentioned above and as shown with additional reference to FIGS. 33-36, the expansion connector 26 may be disposed along the third edge 15 of the motherboard 10 (e.g., on a bottom end of the motherboard 10), and the add-on card 14 may extend upwardly from the expansion connector 26, such that the expansion connector extends towards the first edge 11 of the motherboard 10. In other embodiments, the expansion connector 26 is positioned near the first edge 11, and the add-on card 14 extends downwards towards the third edge 15 of the motherboard 10.

In some embodiments, the add-on card 14 is oriented parallel or substantially parallel to the motherboard 10. In this sense, the add-on card axis 64 defined by the add-on card 14 may be parallel to the motherboard axis 62 defined by the motherboard 10.

As suggested above, the add-on card 14 may be offset from the motherboard 10. For example, the add-on card 14 may be offset from the second planar face 46 of the motherboard 10, and be laterally positioned closer to the second planar face 46 of the motherboard 10 than the first planar face 44 of the motherboard 10. As such, depending on the implementation, the expansion connector 26 may be disposed on the second planar face 46 of the motherboard 10, thus affording the aforementioned offset positioning of the one or more expansion connector slots 27 and the add-on card 14, and further affording the parallel (or substantially parallel) orientation of the one or more connector slots 27 and the add-on card 14 relative to the motherboard 10.

In some embodiments, a planar profile formed by the add-on card 14 overlaps with (or substantially overlaps with) a planar profile formed by the motherboard 10. For example, the add-on card 14 may include a first (e.g., top) edge 91, a second (e.g., lateral) edge 94, a third (e.g., bottom edge) 92 opposite the first edge 91, and a fourth edge 96 opposite the second edge 94. The first, second, third, and fourth edges 91, 94, 92, 96 of the add-on card 14 (or, in other words, either of the first and second planar faces 66, 68 of the add-on card 14) may form a profile that overlaps with a profile formed by the first and/or second faces 44, 46 of the motherboard 10. In particular, the first edge 91 of the add-on card 14 may be positioned lower than the first edge 11 of the motherboard 10, and the third edge 92 of the add-on card 14 may be positioned above the third edge 15 of the mother board 10. Furthermore, in some embodiments, the second edge 94 of the add-on card 14 may be laterally positioned inside of the second edge 13 of the motherboard 10, and the fourth edge 96 of the add-on card 14 may be laterally positioned inside of the fourth edge 17 of the motherboard 10.

As suggested above, the components 21 of the motherboard 10 may be disposed thereon and extend laterally therefrom, and the components 29 of the add-on card 14 may be disposed thereon and extend laterally therefrom. In some embodiments, the components 21 of the motherboard 10 are generally disposed on the first planar face 44 of the motherboard 10, and accordingly such motherboard components 21 extend away from the add-on card 14. Similarly, the components 29 of the add-on card 14 are generally disposed on the second planar face 68 of the add-on card 14 and extend away from the motherboard 10. Advantageously, this arrangement allows for the add-on card 14 and the motherboard 10 to be laterally positioned close to one another, while still affording a vertical gap 39 to be formed therebetween, thus allowing air to circulate between the add-on card 14 and the motherboard 10.

Advantageously, the aforementioned parallel orientation and offset arrangement of the add-on card 14 relative to the motherboard 10 facilitates an efficient use of space within the chassis 12, while also allowing airflow to travel through the chassis 12 and maintain optimal operating temperatures of the device 100.

In further embodiments, the expansion connector 26 is disposed on any region of the motherboard 10 suitable for achieving the advantages discussed herein (e.g., optimizing space usage and maintaining suitable airflow channels). In this sense, in further embodiments, the expansion connector 26 may be alternatively positioned on either of the first or second planar faces 44, 46 of the motherboard 10, and along any of the first, second, or fourth edges 11, 13, 17 of the motherboard 10; in such cases, the expansion connector slots 27 may be oriented towards the opposite appliable edge of the motherboard 10, such that the add-on card 14 is configured to substantially overlap with the motherboard 10. Moreover, the expansion connector 26 may be offset from any of the aforementioned edges of the motherboard 10 (e.g., towards a center of the motherboard 10). In this sense, any overlapping portion of the add-on card 14 and the motherboard 10, particularly in cases where the add-on card 14 and the motherboard 10 are at least substantially parallel, would similarly provide the aforementioned operational advantages for the device 100.

Figure 37:
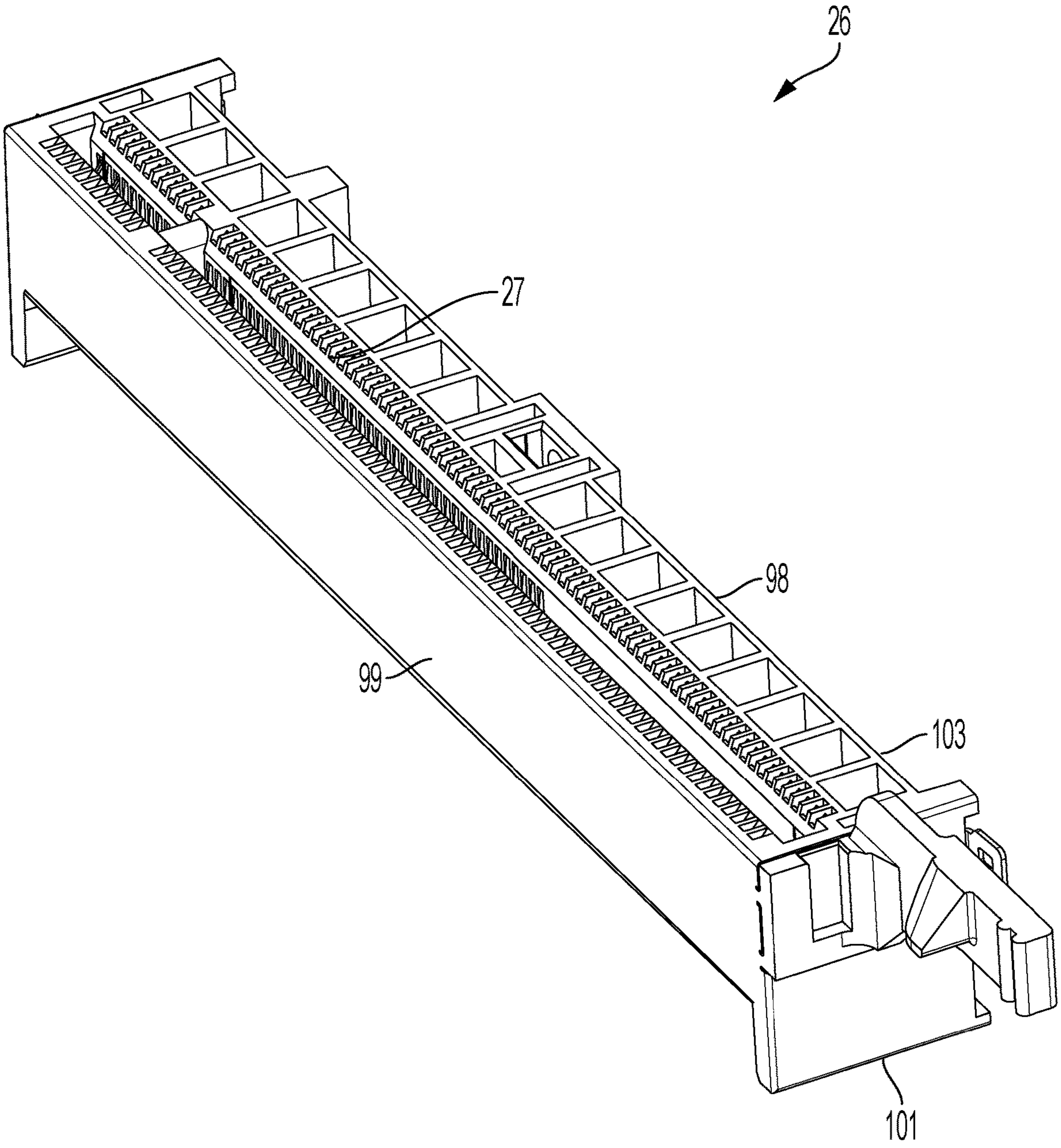
FIG. 37 is a perspective view of an expansion connector for a computing device, according to further embodiments of the present disclosure.

Referring now to FIG. 37, the expansion connector 26 is shown in greater detail, according to some embodiments of the present disclosure. The expansion connector 26 may include an inner face 98. For example, the inner face 98 may be disposed on the second planar face 46 of the motherboard 10 (or, in other embodiments, the first planar face 44). The expansion connector may further include an outer face 99, and the one or more expansion connector slots 27 may be positioned between the inner and outer faces 98, 99. Furthermore, the expansion connector 26 may include a lower face 101 opposite an upper face 103. The one or more expansion connector slots 27 may face the upper face 103. In some embodiments, the lower face 101 of the expansion connector 26 is positioned coplanar with or above (e.g., offset from) the third edge 15 of the motherboard 10, or any other edge of the motherboard 10, depending on the arrangement.

Thus, although there have been described particular embodiments of the present invention of a new and useful COMPUTER MOTHERBOARD, it is not intended that such references to particular embodiments be construed as limitations upon the scope of this invention.

What is claimed is:

1. A computing device, comprising:

a motherboard including a first edge, a second edge, a third edge opposite the first edge, and a fourth edge opposite the second edge, the motherboard further including a first planar face and a second planar face opposite the first planar face;

a socket disposed on the first planar face of the motherboard and configured to receive a central processing unit; and an expansion connector disposed on the second planar face of the motherboard, the expansion connector including one or more expansion connector slots oriented towards the first edge and laterally offset beside the second planar face of the motherboard.

2. The device of claim 1, wherein the one or more expansion connector slots are oriented away from the third edge.

3. The device of claim 1, wherein the expansion connector is disposed on the second planar face of the motherboard along the third edge.

4. The device of claim 1, wherein the first edge is longer than the second edge.

5. The device of claim 1, wherein the one or more expansion connector slots are oriented substantially parallel to the motherboard.

6. The device of claim 5, wherein the expansion connector is a right-angle surface mount peripheral component interconnect (PCI) connector.

7. The device of claim 1, wherein the expansion connector does not straddle any edge of the motherboard.

8. The device of claim 1, further comprising an add-on card disposed in at least one of the one or more expansion connector slots and offset laterally beside the motherboard-wherein the one or more expansion connector slots are oriented parallel to the first planar face.

9. The device of claim 8, wherein the add-on card is a graphics processing unit.

10. The device of claim 9, further comprising a gap between the add-on card and the motherboard such that air may circulate between the add-on card and the motherboard.

11. A computing device, comprising:

a motherboard including a first edge, a second edge, a third edge opposite the first edge, and a fourth edge opposite the second edge, the motherboard further including a first planar face and a second planar face opposite the first planar face;

a socket disposed on the first planar face of the motherboard and configured to receive a central processing unit;

a surface mount expansion connector disposed on the second planar face of the motherboard; and an add-on card disposed on the expansion connector and laterally offset beside the motherboard, wherein the add-on card is oriented to extend from the expansion connector towards the first edge.

12. The device of claim 11, wherein the add-on card is oriented to extend from the expansion connector away from the third edge.

13. The device of claim 11, wherein the expansion connector is disposed on the second planar face along the third edge.

14. The device of claim 11, wherein the first edge is longer than the second edge.

15. The device of claim 11, wherein the add-on card is oriented substantially parallel to the motherboard.

16. The device of claim 15, wherein the add-on card is a graphics processing unit.

17. The device of claim 16, further comprising a gap between the add-on card and the motherboard such that air may circulate between the add-on card and the motherboard.

18. The device of claim 11, wherein the expansion connector does not straddle any edge of the motherboard.

19. The device of claim 11, wherein the add-on card is positioned offset from the second planar face.

20. The device of claim 19, further comprising a central processing unit disposed in the socket on the first planar face.

* * * * *